Figure 1:
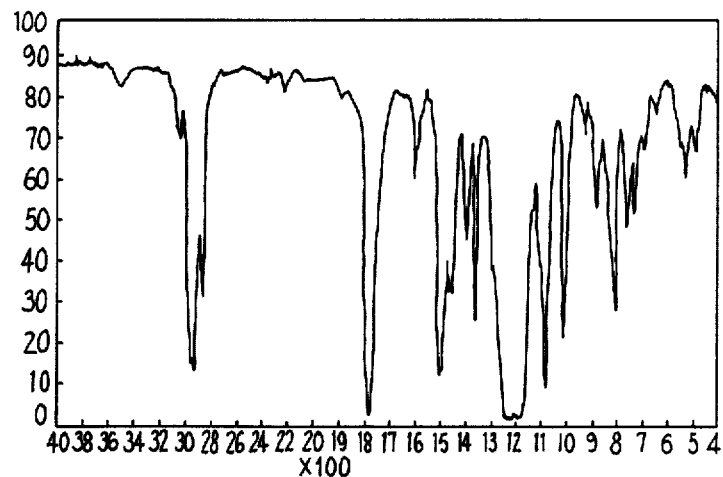

United States Patent [19]

Kanno et al.

[11] Patent Number: 4,831,110
[45] Date of Patent: May 16, 1989

[54] CO-POLYCARBONATE COPOLYMER FROM 2,2-BIS(4-HYDROXY-3-TERTIARY BUTYL PHENYL)PROPANE AND OPTICAL DISK

[75] Inventors: Tatsuya Kanno; Ikuo Takahashi; Kenichi Sasaki; Tsuyoshi Habe; Tsuyoshi Sei, all of Himeji, Japan

[73] Assignee: Daicel Chemical Industries, Ltd., Osaka, Japan

[21] Appl. No.: 128,497

[22] Filed: Dec. 3, 1987

[30] Foreign Application Priority Data

| Dec. 19, 1986 | [JP] | Japan | 61-301403 |
| Dec. 19, 1986 | [JP] | Japan | 61-301407 |
| Dec. 19, 1986 | [JP] | Japan | 61-301408 |
| Jan. 16, 1987 | [JP] | Japan | 62-7932 |
| Jan. 30, 1987 | [JP] | Japan | 62-20250 |
| Jan. 30, 1987 | [JP] | Japan | 62-20251 |
| Jan. 30, 1987 | [JP] | Japan | 62-20252 |
| Jan. 30, 1987 | [JP] | Japan | 62-20253 |

[51] Int. Cl.$^4$ ............................................. C08G 63/62
[52] U.S. Cl. .................................. 528/204; 365/126; 428/412; 503/200
[58] Field of Search ............................... 528/204, 196

[56] References Cited

U.S. PATENT DOCUMENTS 4,237,259 12/1980 Keeley ............................ 528/204
4,734,488 3/1988 Hasuo et al. .................... 528/204

Primary Examiner—Harold D. Anderson
Attorney, Agent, or Firm—Flynn, Thiel, Boutell & Tanis

[57] ABSTRACT

An aromatic polycarbonate copolymer is useful for a substrate of an optical disk and is composed of 1 to 99 mole percent of the unit of 2,2-bis(4-hydroxy-3-tertiary-butyl-phenyl)propane, 99 to 1 mole percent of the unit of a comonomer selected from the group consisting of
(1) 2,2-bis(4-hydroxyphenyl)propane,
(2) 4,4'-dihydroxy-2,2,2-triphenylethane,
(3) 2,2-bis(4-hydroxy-3-methylphenyl)-propane,
(4) 1,1'-bis(4-hydroxyphenyl)-p-diisopropylbenzene,
(5) 1,1'-bis(4-hydroxyphenyl)-m-diisopropyl-benzene,
(6) 2,2-bis(4-hydroxyphenyl)butane,
(7) 2,2-bis(4-hydroxyphenyl)-4-methylpentane,
(8) 2,2-bis(4-hydroxyphenyl)octane,
(9) 1,1-bis(4-hydroxyphenyl)cyclohexane and
(10) 2,2-bis(3,5-dimethyl-4-hydroxyphenyl)propane
and a carbonate group located between the two units.

7 Claims, 10 Drawing Sheets

CO-POLYCARBONATE COPOLYMER FROM 2,2-BIS(4-HYDROXY-3-TERTIARY BUTYL PHENYL)PROPANE AND OPTICAL DISK

The present invention relates to a polycarbonate copolymer usable in an optical information recording disk in which signals are recorded by means of a laser beam or recorded signals are read by utilizing the reflecting or transmission of the laser beam.

Prior Art

A quite high recording density can be provided by an information recording/reproduction system of DRAW type or Erasable-DRAW-type in which a spot laser beam is applied to a disk to record signals on the disk of means of minute pits or the signals thus recorded by means of such pits are read by detecting the quantity of reflected or transmitted laser beam. Particularly in the system of Erasable-DRAW type, the record can be erased or written and images and sounds reproduced therefrom are excellent. Thus, it is expected to employ the system of Erasable-DRAW type broadly in the recording of images and sounds or reproduction of them and in the recording/reproduction of a large quantity of information. The disk used in the recording-/reproduction system must be not only transparent so as to transmit the laser beam through the disk body but also optically uniform so as to minimize an error in the readout. When the laser beam is transmitted through the disk body, double refraction occurs due to mainly a thermal stress caused in the cooling and flowing steps of a resin in the molding to form the disk body, molecular orientation and residual stress caused by a change in volume around a glass transition point. A high optical ununiformity due to the double refraction is a fatal defect of optical disks.

The double refraction of the disk occurring due to mainly the thermal stress caused in the cooling and flowing steps of a resin in the molding to form the disk body, molecular orientation and residual stress can be reduced considerably by selecting the molding conditions suitably. However, it still depends greatly on the intrinsic double refraction, i.e. photoelasticity constant, of the molded resin per se.

The double refraction can be represented as the product of the photoelasticity constant and residual stress according to the following formula (1):

$$n_1 - n_2 = C(\sigma_1 - \sigma_2) \quad (1)$$

wherein:

$n_1 - n_2$ represents a double refraction,
$\sigma_1 - \sigma_2$ represents a residual stress, and
C represents a photoelasticity constant.

It is apparent that the double refraction of the obtained disk can be reduced by reducing the photoelasticity constant in the above formula (1) even when the molding conditions are unchanged. The inventors have found that a resin having a low photoelasticity constant can be obtained without impairing the mechanical properties thereof by copolymerizing 2,2-bis(4-hydroxy-3-tertiary-butyl-phenyl)propane with a specific comonomer through a carbonate linkage. The present invention has been completed on the basis of this finding.

The invention provides an aromatic polycarbonate copolymer composed of 1 to 99 mole percent of the unit of 2,2-bis(4-hydroxy-3-tertiary-butyl-phenyl)propane, 99 to 1 mole percent of the unit of a comonomer selected from the group consisting of (1) 2,2-bis(4-hydroxyphenyl)propane,
(2) 4,4'-dihydroxy-2,2,2-triphenylethane,
(3) 2,2-bis(4-hydroxy-3-methylphenyl)-propane,
(4) 1,1'-bis(4-hydroxyphenyl)-p-diisopropylbenzene,
(5) 1,1'-bis(4-hydroxyphenyl)-m-diisopropyl-benzene,
(6) 2,2-bis(4-hydroxyphenyl)butane,
(7) 2,2-bis(4-hydroxyphenyl)-4-methylpentane,
(8) 2,2-bis(4-hydroxyphenyl)octane,
(9) 1,1-bis(4-hydroxyphenyl)cyclohexane and
(10) 2,2-bis(3,5-dimethyl-4-hydroxyphenyl)propane and a carbonate group located between the two units.

The aromatic polycarbonate copolymer of the invention can be obtained from the first monomer and the comonomer by a carbonate linkage between them.

It is preferred that the comonomer is selected from the group consisting of (1), (2), (3), (4) and (5); the copolymer is composed of 5 to 95 mole percent of the unit of 2,2-bis(4-hydroxy-3-tertiary-butylphenyl)propane, 95 to 5 mole percent of the unit of a comonomer selected from the group consisting of (1), (2), (4), (5) and (9) and a carbonate group located between the two units; and the copolymer is composed of 3 to 97 mole percent of the unit of 2,2-bis(4-hydroxy-3-tertiary-butyl-phenyl)-propane, 97 to 3 mole percent of the unit of a comonomer selected from the group consisting of (6), (7), (8) and (10) and a carbonate group located between the two units.

The invention further provides an optical disk which comprises a substrate of the copolymer as defined above and a recording layer coated thereon.

It is preferred that the copolymer to use for the substrate has a viscosity-average molecular weight of 13,000 to 50,000.

The first monomer has the formula (I):

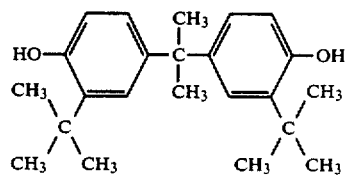

The comonomers have the formulae (II 1 to 10):

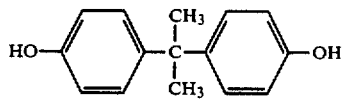

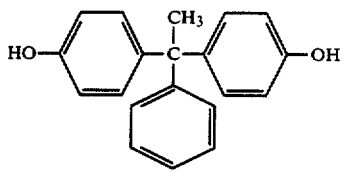

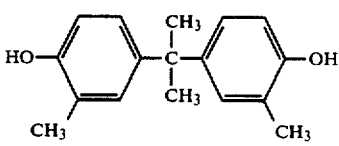

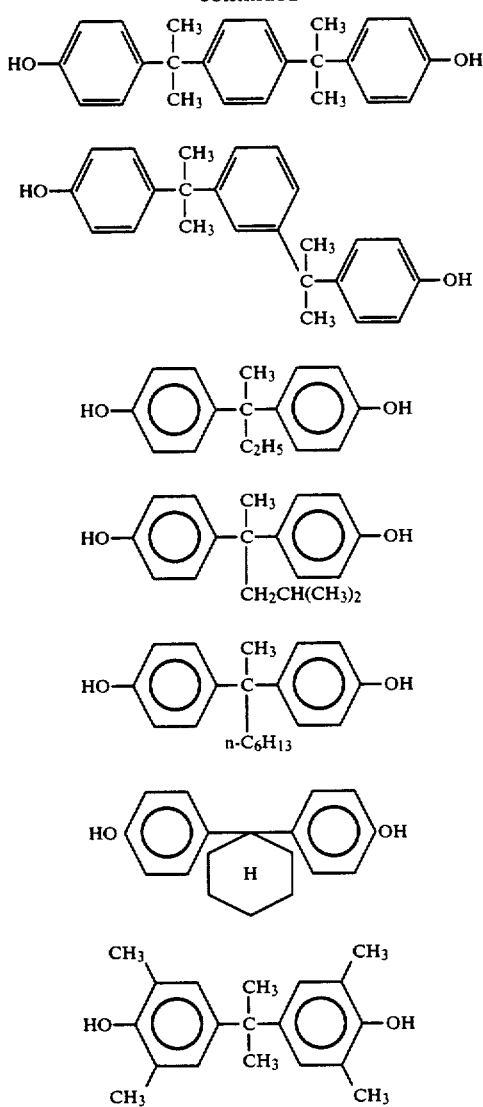
-continued

The copolymer of the invention has the above defined proportions of the two constituent monomers. If the monomer (I) amounts to less than 5 mole percent, the copolymer gets to have almost the same photoelasticity constant as the homopolycarbonate of the monomer (II). If it amounts to more than 95 mole percent, the copolymer gets to have much lower glass transition point than the homopolycarbonate of the monomer (II).

The copolymer of the present invention has a viscosity-average molecular weight of preferably 1,000 to 100,000 and more preferably 13,000 to 50,000. When this value is less than 1,000, the produced moldings are brittle and, on the contrary, when it exceeds 100,000, the fluidity is lowered to reduce the moldability thereof. Thus, the resin having a viscosity-average molecular weight of less than 1,000 or higher than 100,000 is unsuitable for use as the starting material for the optical disks.

The polycarbonate copolymer of the invention may further comprise a third monomer unit in addition to the above shown essential two monomer units. It may be any compound capable of being bonded through the carbonate linkage. The amount (weight ratio) of the third component is not limited so far as it does not impair the physical properties of the product.

The polycarbonate copolymer of the present invention can be prepared by the two following processes:

(1) transesterification process

The two monomers are reacted with each other in the presence of diphenyl carbonate in an amount slightly larger than its stoichiometric amount add an ordinary carbonation catalyst at a temperature of about 160° to 180° C. under atmospheric pressure for about 30 min while an inert gas is introduced thereinto. Then, the pressure is reduced gradually over 2 h to finally 10 Torr at about 180° to 220° C. to complete the precondensation reaction at 220° C. Then the reaction is continued at 270° C. under 10 Torr for 30 min and then at 270° C. under 5 Torr for 20 min. Thereafter the postcondensation reaction is conducted at 270° C. under a reduced pressure of lower than 0.5 Torr, preferably 0.3 to 0.1 Torr, for 1.5 to 2.0 h.

Suitable carbonation catalysts used for forming the carbonate linkage include alkali metal and alkaline earth metal catalysts such as lithium, potassium, sodium, calcium and tin catalysts. Examples of them include lithium hydroxide, lithium carbonate, potassium borohydride, potassium hydrogenphosphate, sodium hydroxide, sodium borohydride, calcium hydride, dibutyltin oxide and stannous oxide. Among them, the potassium catalysts are preferred.

(2) Phosgene process

A three-necked flask is provided with a stirrer, thermometer, gas-inlet tube and gas-outlet tube. A mixture of the two monomers is dissolved in a solvent such as pyridine or dichloromethane and gaseous phosgene is introduced thereinto under vigorous stirring. This operation is conducted in a powerful draft chamber, since phosgene is virulent. A unit for decomposing excess phosgene into nonpoisonous compounds with a 10% aqueous sodium hydroxide solution is provided at an end of the outlet tube. Phosgene is introduced from a bomb into the flask through an empty gas washing bottle, a gas washing bottle containing paraffin (to count the number of bubbles) and an empty gas washing bottle sequentially. The gas inlet tube is inserted into the flask and placed above the stirrer and the end thereof is widened like a funnel so that it would not be clogged by the formed pyridine salt.

As the gas is introduced into the flask, pyridine hydrochloride is precipitated and the reaction mixture becomes turbid. The reaction mixture is cooled with water to keep the reaction temperature below 30° C. As the condensation reaction proceeds, the reaction mixture becomes viscous. Phosgene is introduced thereinto until yellow color of phosgene/hydrogen chloride complex no more disappears. After completion of the reaction, methanol is added to precipitate the polymer, which is filtered and dried. The polycarbonate thus formed, being soluble in methylene chloride, pyridine, chloroform, tetrahydrofuran or the like, is dissolved therein and reprecipitated from methanol to purify the same.

The aromatic polycarbonate of the invention is useful as a starting material for an optical disk to record information with. The disk according to the invention includes the direct read after write type (DRAW) and the erasable direct read after write type (Erasable DRAW)

and serves to record signals with a laser beam and read recorded signals with reflection or transmission of a laser beam.

From the practical point of view, the polycarbonate is used as a supporting substrate for a recording layer. A disk of it is covered with a recording layer such as evaporated metals to form a recording medium. Two recording disks obtained this way are assembled into one body, for example by bonding with an adhesive or melting and bonding with the ultrasonic waves, through a spacer so that the two recording surface may be faced to each other. The recording layer may be further covered with a protective layer.

The polycarbonate copolymer of the present invention having a low photoelasicity constant can be ueed as a starting material for optical information recording disks wherein signals are recorded by a laser beam or recorded signals are read by utilizing the reflection or transmission of the laser beam.

BRIEF DESCRIPTION OF THE ATTACHED DRAWINGS

They show IR spectra and NMR spectra of the copolymers obtained in the examples, IR spectra odd-numbered, NMR spectra even-numbered.

Figure 2:
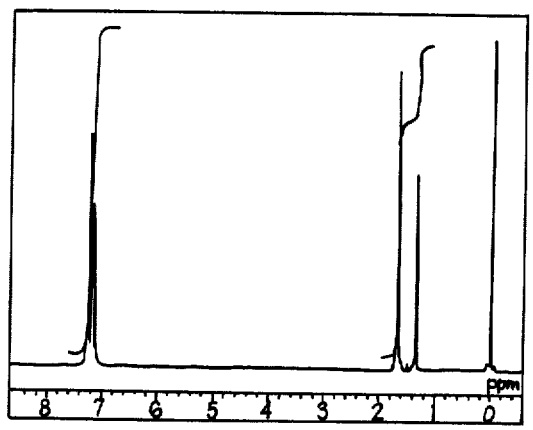

| FIGS. 1 and 2 | show those of Example 1, |
|---|---|
| 3 and 4, | 3, |
| 5 and 6, | 5, |
| 7 and 8, | 7, |
| 9 and 10, | 9, |
| 11 and 12, | 11, |
| 13 and 14, | 13, |
| 15 and 16, | 15, |
| 17 and 18, | 17, |
| 19 and 20, | 19, |
| 21 and 22, | 21, |
| 23 and 24, | 23, |
| 25 and 26, | 25, |
| 27 and 28, | 27, and |
| 29 and 30, | 29. |

EXAMPLES

The following examples will further illustrate the present invention, which by no means limit the invention.

In the examples, parts and percentages are given by weight.

EXAMPLE 1

247 parts (90 molar %) of 2,2-bis(4-hydroxyphenyl)-propane, 41 parts (10 molar %) of 2,2-bis(4-hydroxy-3-tert-butylphenyl)propane and 264 parts of diphenyl carbonate were placed in a 3-l three-necked flask. After repeating degassing and nitrogen purge five times, the mixture was molten at 160° C. in a silicone bath while nitrogen was introduced thereinto. A solution of potassium borohydride (carbonation catalyst) in phenol prepared previously was added to the melt in an amount of $10^{-3}$ molar % based on the total amount of the bisphenol fed. After aging under stirring at 160° C. in a nitrogen atmosphere for 30 min, the pressure was reduced to 100 Torr at that temperature and the mixture was stirred for 30 min. Further the pressure was reduced to 50 Torr at that temperature and the reaction was continued for additional 30 min. The temperature was elevated slowly to 220° C. and the reaction was conducted for 60 min to distill phenol in an amount of 80% based on a theoretical amount. Then the pressure was reduced to 10 Torr at that temperature and the reaction was conducted for 30 min. The temperature was elevated slowly to 270° C. and the reaction was conducted for 30 min. Further the pressure was reduced to 5 Torr at that temperature and the reaction was conducted for 30 min. The precondensation was thus completed and a nearly theoretical amount of phenol was distilled until this step. Thereafter the postcondensation reaction was conducted at that temperature under 0.1 to 0.3 Torr for 2 h. The resulting polymer was taken out and cooled in a nitrogen atmosphere and its solution viscosity was determined using dichloromethane as the solvent at 20° C. The viscosity-average molecular weight $\overline{M}v$ calculated from the solution viscosity was 23,000. In its IR spectrum, a characteristic absorption of a carbonate bond was observed at 1750 to 1800 $cm^{-1}$ (FIG. 1). In its $^1$H-NMR spectrum, absorptions of hydrogen in the methyl group of a tert-butyl group at 1.34 and 1.38 ppm, hydrogen in the methyl group of propane at 1.68 ppm and a phenyl group at 7.03 to 7.37 ppm were observed (FIG. 2). From the results of the determination with DSC (differential scanning calorimeter; Perkin-Elmer 2C), it was found that the glass transition point Tg was 143° C. The photoelasticity constant C was 60 Brewsters (10 $m^2$/N). From the integrated value of the NMR chart, it was confirmed that the polymer was a polycarbonate copolymer comprising 2,2-bis(4-hydroxyphenyl)propane and 2,2-bis(4-hydroxy-3-tert-butylphenyl)propane in a ratio of 9:1.

The devices used in the measurement were an IR spectrometer (IR-810; a product of Nippon Bunkô Co.), a $^1$H-NMR device JNP-GX-270; (a product of JEOL, Ltd.) and a DSC [(differential scanning calorimeter (Perkin-Elmer 2C)]. The photoelasticity constant was determined with a device made by the present inventors. The photoelasticity constant was determined by applying various tensile stresses to test pieces(50 mm×10 mm×1 mm) lengthwise, measuring the double refraction, putting the value in the above-mentioned formula (1) and determining the photoelasticity constant from the gradient. The photoelasticity constant of 2,2-bis(4-hydroxyphenyl)propane polycarbonate was 82 Brewsters ($10^{-12}$ $m^2$/N).

EXAMPLE 2

A three-necked flask was provided with a stirrer, thermometer, gas-inlet tube and gas-outlet tube. 247 parts (90 molar %) of 2,2-bis(4-hydroxyphenyl)propane and 41 parts (10 molar %) of 2,2-bis(4-hydroxy-3-tert-butylphenyl)propane were dissolved in a 10% aqueous sodium hdyroxide solution. Dichloromethane was added to the solution thus prepared. Gaseous phosgene was introduced there into under vigorous stirring. Phosgene was introduced from a bomb into the flask through an empty gas washing bottle, a gas washing bottle containing water and an empty gas washing bottle sequentially. The reaction temperature was kept below 25° C. with water during the introduction of gaseous phosgene. As the condensation reaction proceeded, the solution became viscous. Phosgene was introduced thereinto until yellow color of phosgene/hydrogen chloride complex no more disappeared. After completion of the reaction, the reaction solution was poured into methanol, the mixture was filtered and the filtration residue was washed with water. This procedure was repeated. The polycarbonate thus formed in the form of a solution in dichloromethane was reprecipitated from methanol to purify the same.

After the purification followed by drying, the solution viscosity of the product was determined using dichloromethane as the solvent at 20° C. The viscosity-average molecular weight $\overline{M}v$ calculated from the solution viscosity was 35,000. From the fact that the results similar to those obtained in Example 1 were obtained by the instrumental analysis conducted in the same manner as in Example 1, the formed polymer was identified with a polycarbonate coplymer comprising 2,2-bis-(4-hydroxyphenyl)propane and 2,2-bis(4-hydroxy-3-tert-butylphenyl)propane in a ratio of 9:1.

EXAMPLE 3

Figure 3:
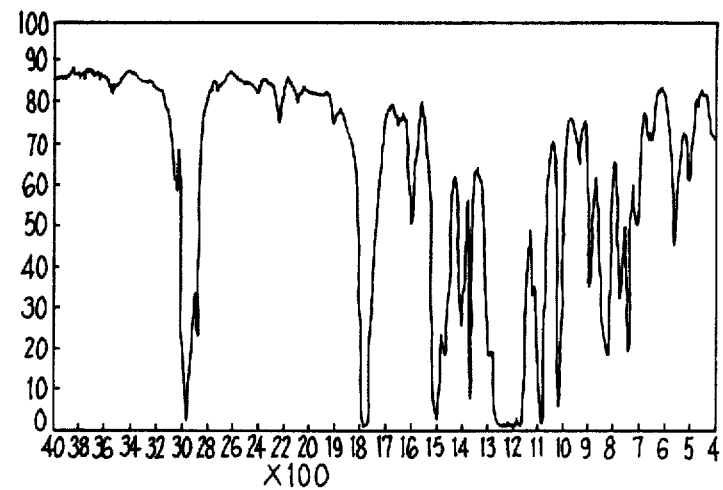
Figure 4:
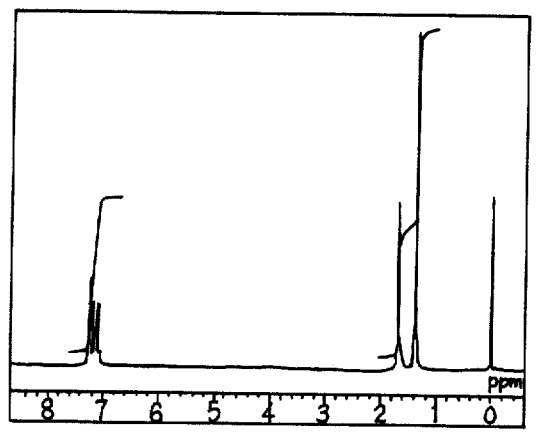

137 parts (50 molar %) of 2,2-bis-(4-hydroxyphenyl)-propane, 204 parts (50 molar %) of 2,2-bis(4-hydroxy-3-tert-butylphenyl)propane and 264 parts of diphenyl carbonate were placed in a 3-l three-necked flask. After repeating degassing and nitrogen purge five times, the mixture was molten at 160° C. in a silicone bath while nitrogen was introduced thereinto. A solution of potassium borohydride (carbonation catalyst) in phenol prepared previously was added to the melt in an amount of $10^{-3}$ molar % based on the total amount of the bisphenol fed. After aging under stirring at 160° C. in a nitrogen atmosphere for 30 min, the pressure was reduced to 100 Torr at that temperature and the mixture was stirred for 30 min. Further the pressure was reduced to 50 Torr at that temperature and the reaction was continued for additional 60 min. The temperature was elevated slowly to 220° C. and the reaction was conducted for 60 min. The amount of phenol distilled until this step was 80% based on a theoretical amount. Then the pressure was reduced to 10 Torr at that temperature and the reaction was conducted for 30 min. The temperature was elevated slowly to 270° C. and the reaction was conducted for 30 min. Further the pressure was reduced to 5 Torr at that temperature and the reaction was conducted for 30 min. The precondensation was thus completed and a nearly theoretical amount of phenol was distilled until this step. Thereafter the postcondensation reaction was conducted at that temperature under 0.1 to 0.3 Torr for 2 h. The resulting polymer was taken out and cooled in a nitrogen atmosphere and its solution viscosity was determined using dichloromethane as the solvent at 20° C. The viscosity-average molecular weight $\overline{M}v$ calculated from the solution viscosity was 24,000. In its IR spectrum, a characteristic absorption of a carbonate bond was observed at 1740 to 1810 cm$^{-1}$ (FIG. 3). In its $^1$H-NMR spectrum, absorptions of hydrogen in the methyl group of a tert-butyl group at 1.34 ppm and 1.38 ppm, hydrogen in the methyl group of propane at 1.68 ppm and a phenyl group at 7.01 to 7.32 ppm were observed (FIG. 4). From the results of the determination with DSC, it was found that the glass transition point Tg was 132° C. The photoelasticity constant C was 47 Brewsters ($10^{-12}$ m$^2$/N) From the integrated value of the NMR chart, it was confirmed that the polymer was a polycarbonate copolymer comprising 2,2-bis(4-hydroxyphenyl)propane and 2,2-bis(4-hydroxy-3-tert-butylphenyl)propane in a ratio of 1:1.

EXAMPLE 4

A three-necked flask was provided with a stirrer, thermometer, gas-inlet tube and gas-outlet tube. 137 parts (50 molar %) of 2,2-bis(4-hydroxyphenyl)propane and 204 parts (50 molar %) of 2,2-bis(4-hydroxy-3-tert-butylphenyl)propane were dissolved in a 10% aqueous sodium hydroxide solution. Dichloromethane was added to the solution thus prepared. Gaseous phosgene was introduced thereinto under vigorous stirring. Phosgene was introduced from a bomb into the flask through an empty gas washing bottle, a gas washing bottle containing water and an empty gas washing bottle sequentially. The reaction temperature was kept below 25° C. with water during the introduction of gaseous phosgene. As the condensation reaction proceeded, the solution became viscous. Phosgene was introduced thereinto until yellow color of phosgene/hydrogen chloride complex no more disappeared. After completion of the reaction, the reaction solution was poured into methanol, the mixture was filtered and the filtration residue was washed with water. This procedure was repeated. The polycarbonate thus formed in the form of a solution in dichloromethane was reprecipitated from methanol to purify the same.

After the purification followed by drying, the solution viscosity of the product was determined using dichloromethane as the solvent at 20° C. The viscosity-average molecular weight $\overline{M}v$ calculated from the solution viscosity was 26,000. From the fact that the results similar to those obtained in Example 3 were obtained by the instrumental analysis conducted in the same manner as in Example 3, the formed polymer was identified with a polycarbonate copolymer comprising 2,2-bis(4-hydroxyphenyl)propane and 2,2-bis(4-hydroxy-3-tert-butylphenyl)propane in a ratio of 1:1.

EXAMPLE 5

Figure 5:
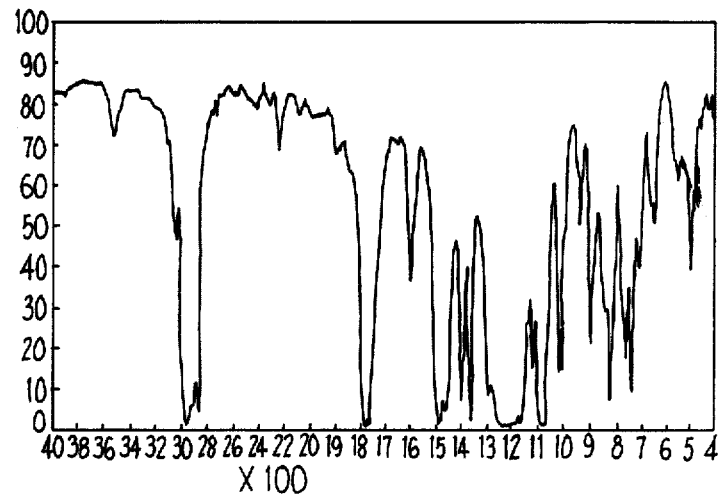
Figure 6:
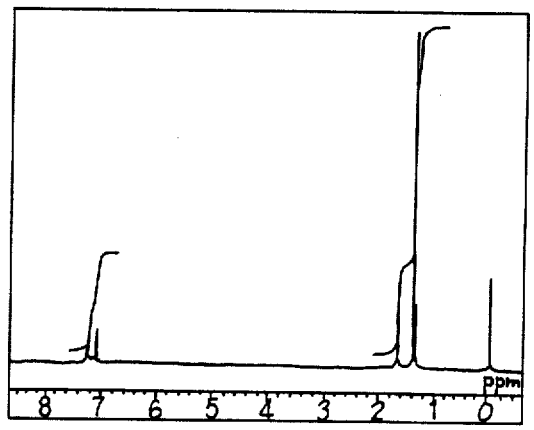

41 parts (15 molar %) of 2,2-bis(4-hydroxyphenyl)-propane, 347 parts (85 molar %) of 2,2-bis(4-hydroxy-3-tert-butylphenyl)propane and 264 parts of diphenyl carbonate were placed in a 3-l three-necked flask. After repeating degassing and nitrogen purge five times, the mixture was molten at 160° C. in a silicone bath while nitrogen was introduced thereinto. A solution of potassium borohydride (carbonation catalyst) in phenol prepared previously was added to the melt in an amount of $10^{-3}$ molar % based on the total amount of the bisphenol fed. After aging under stirring at 160° C. in a nitrogen atmosphere for 30 min, the pressure was reduced to 100 Torr at that temperature and the mixture was stirred for 30 min. Further the pressure was reduced to 50 Torr at that temperature and the reaction was continued for additional 60 min. The temperature was elevated slowly to 220° C. and the reaction was conducted for 60 min. The amount of phenol distilled until this step was 80% based on a theoretical amount. Then the pressure was reduced to 10 Torr at that temperature and the reaction was conducted for 30 min. The temperature was elevated slowly to 270° C. and the reaction was conducted for 30 min. Further the pressure was reduced to 5 Torr at that temperature and the reaction was conducted for 30 min. The precondensation was thus completed and a nearly theoretical amount of phenol was distilled until this step. Thereafter the postcondensation reaction was conducted at that temperature under 0.1 to 0.3 Torr for 2 h. The resulting polymer was taken out and cooled in a nitrogen atmosphere and its solution viscosity was determined using dichloromethane as the solvent at 20° C. The viscosity-average molecular weight $\overline{M}v$ calculated from the solution viscosity was 16,000. In its IR spectrum, a characteristic absorption of a carbonate bond was observed at 1730 to 1810 cm$^{-1}$ (FIG. 5). In its $^1$H-NMR spectrum, absorptions of hydrogen in the methyl group of a tert-butyl group at 1.34 and 1.38 ppm, hydrogen in the methyl group of propane at 1.68 ppm and phenyl group at 7.02 to 7.28 were observed (FIG. 6). From the results of the determination with DSC, it was found that the glass transition point Tg was 123° C. The photoelasticity constant C was 32 Brewsters ($10^{-12}$ m²/N). From the integrated value of the NMR chart, it was confirmed that the polymer was a polycarbonate copolymer comprising 2,2-bis(4-hydroxyphenyl)propane and 2,2-bis(4-hydroxy-3-tert-butylphenyl)propane in a ratio of 3:17.

EXAMPLE 6

A three-necked flask was provided with a stirrer, thermometer, gas-inlet tube and gas-outlet tube. 41 parts (15 molar %) of 2,2-bis(4-hydroxyphenyl)propane and 347 parts (85 molar %) of 2,2-bis(4-hydroxy-3-tert-butylphenyl)propane were dissolved in a 10% aqueous sodium hydroxide solution. Dichloromethane was added to the solution thus prepared. Gaseous phosgene was introduced thereinto under vigorous stirring. Phosgene was introduced from a bomb into the flask through an empty gas washing bottle, a gas washing bottle containing water and an empty gas washing bottle sequentially. The reaction temperature was kept below 25° C. with water during the introduction of gaseous phosgene. As the condensation reaction proceeded, the solution became viscous. Phosgene was introduced thereinto until yellow color of phosgene/hydrogen chloride complex no more disappeared. After completion of the reaction, the reaction solution was poured into methanol, the mixture was filtered and the filtration residue was washed with water. This procedure was repeated. The polycarbonate thus formed in the form of a solution in dichloromethane was reprecipitated from methanol to purify the same.

After the purification followed by drying, the solution viscosity of the product was determined using dichloromethane as the solvent at 20° C. The viscosity-average molecular weight $\overline{Mv}$ calculated from the solution viscosity was 20,000. From the fact that the results similar to those obtained in Example 5 were obtained by the instrumental analysis conducted in the same manner as in Example 5, the formed polymer was identified with a polycarbonate copolymer comprising 2,2-bis(4-hydroxyphenyl)propane and 2 2-bis(4-hydroxy-3-tert-butylphenyl)propane in a ratio of 3:17.

EXAMPLE 7

Figure 7:
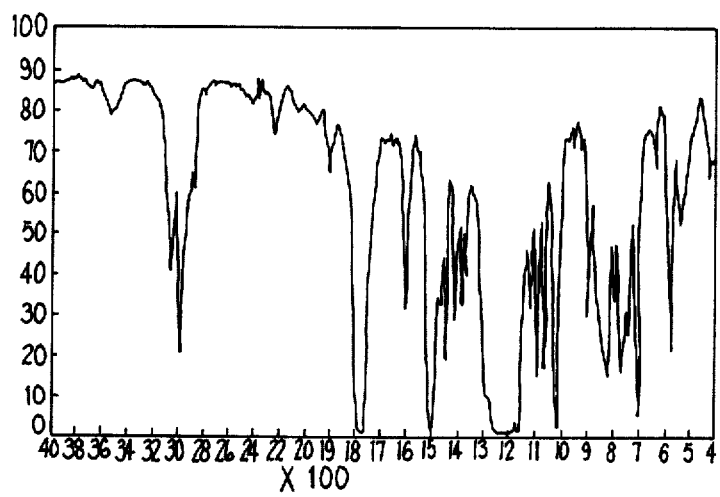
Figure 8:
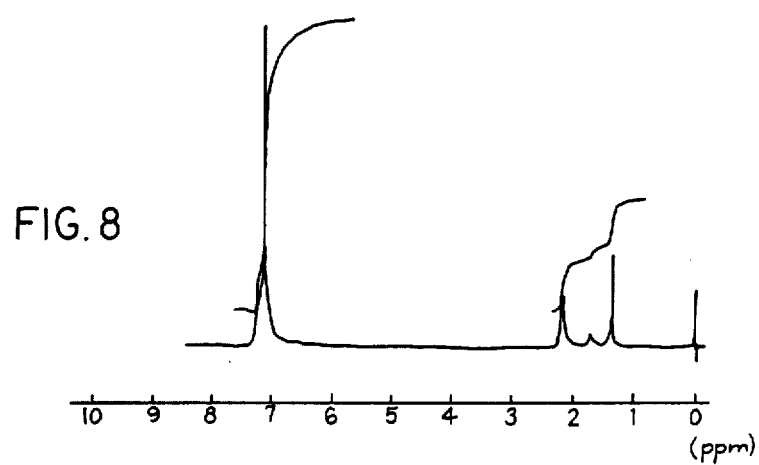

314 parts (90 molar %) of 4,4'-dihydroxy-2,2,2-triphenylethane, 41 parts (10 molar %) of 2,2-bis(4-hydroxy-3-tert-butylphenyl)propane and 264 parts of diphenyl carbonate were placed in a 3-l three-necked flask. After repeating degassing and nitrogen purge five times, the mixture was molten at 160° C. in a silicone bath while nitrogen was introduced thereinto. A solution of potassium borohydride (carbonation catalyst) in phenol prepared previously was added to the melt in an amount of $10^{-3}$ molar % based on the total amount of the bisphenol fed. After aging under stirring at 160° C. in a nitrogen atmosphere for 30 min, the pressure was reduced to 100 Torr at that temperature and the mixture was stirred for 30 min. Further the pressure was reduced to 50 Torr at that temperature and the reaction was continued for additional 30 min. The temperature was elevated slowly to 220° C. and the reaction was conducted for 60 min to distill phenol in an amount of 80% based on a theoretical amount. Then the pressure was reduced to 10 Torr at that temperature and the reaction was conducted for 30 min. The temperature was elevated slowly to 270° C. and the reaction was conducted for 30 min. Further the pressure was reduced to 5 Torr at that temperature and the reaction was conducted for 30 min. The precondensation was thus completed and a nearly theoretical amount of phenol was distilled until this step. Thereafter the postcondensation reaction was conducted at that temperature under 0.1 to 0.3 Torr for 2 h. The resulting polymer was taken out and cooled in a nitrogen atmosphere and its solution viscosity was determined using dichloromethane as the solvent at 20° C. The viscosity-average molecular weight $\overline{Mv}$ calculated from the solution viscosity was 15,400. In its IR spectrum, a characteristic absorption of a carbonate bond was observed at 1740 to 1820 cm$^{-1}$ (FIG. 7). In its 1H-NMR spectrum, absorptions of hydrogen in the methyl group of a tert-butyl group at 1.36 ppm, hydrogen in the methyl group of propane of 2,2-bis(4-hydroxy-3-tert-butylphenyl)propane at 1.7 ppm, hydrogen in the methyl group of 4,4'-dihydroxy-2,2,2-triphenylethane at 2.2 ppm and phenyl group at 6.9 to 7.4 ppm were observed (FIG. 8). From the results of the determination with DSC (differential scanning calorimeter; Perkin-Elmer 2C), it was found that the glass transition point Tg was 169° C. The photoelasticity constant C was 51 Brewsters ($10^{-12}$ m²/N). From the integrated value of the NMR chart, it was confirmed that the polymer was a polycarbonate copolymer comprising 4,4'-dihydroxy-2,2,2-triphenylethane and 2,2-bis(4-hydroxy-3-tert-butylphenyl)propane in a ratio of 9:1.

The devices used in the measurement were an IR spectrometer (IR-810; a product of Nippon Bunkô Co.), a 1H-NMR device (JNM-MH-100; a product of JEOL, Ltd.) and a DSC [differential scanning calorimeter (Perkin-Elmer 2C)]. The photoelasticity constant was determined with a device made by the present inventors. The photoelasticity constant was determined by applying various tensile stresses to test pieces (50 mm×10 mm×1 mm) lengthwise, measuring the double refraction, putting the value in the above-mentioned formula (1) and determining the photoelasticity constant from the gradient. The photoelasticity constant of 2,2-bis(4-hydroxyphenyl)propane polycarbonate was 82 Brewsters ($10^{-12}$ m²/N).

EXAMPLE 8

A three-necked flask was provided with a stirrer, thermometer, gas-inlet tube and gas-outlet tube. 314 parts (90 molar %) of 4,4'-dihydroxy-2,2,2-triphenylethane and 41 parts (10 molar %) of 2, 2-bis(4-hydroxy-3-tert-butylphenyl)propane were dissolved in a 10% aqueous sodium hydroxide solution. Dichloromethane was added to the solution thus prepared. Gaseous phosgene was introduced thereinto under vigorous stirring. Phosgene was introduced from a bomb into the flask through an empty gas washing bottle, a gas washing bottle containing water and an empty gas washing bottle sequentially. The reaction temperature was kept below 25° C. with water during the introduction of gaseous phosgene. As the condensation reaction proceeded, the solution became viscous. Phosgene was introduced thereinto until yellow color of phosgene/hydrogen chloride complex no more disappeared. After completion of the reaction, methanol was poured into the reaction solution, the mixture was filtered and the filtration residue was washed with water. This procedure was repeated. The polycarbonate thus formed in the form of a solution in dichloromethane was re-precipitated from methanol to purify the same.

After the purification followed by drying, the solution viscosity of the product was determined using dichloromethane as the solvent at 20° C. The viscosity-average molecular weight $\overline{M}v$ calculated from the solution viscosity was 35,000. From the fact that the results similar to those obtained in Example 7 were obtained by the instrumental analysis conducted in the same manner as in Example 7, the formed polymer was identified with a polycarbonate copolymer comprising 4,4'-dihydroxy-2,2,2-triphenylethane and 2,2-bis(4-hydroxy-3-tert-butylphenyl)propane in a ratio of 9:1.

EXAMPLE 9

Figure 9:
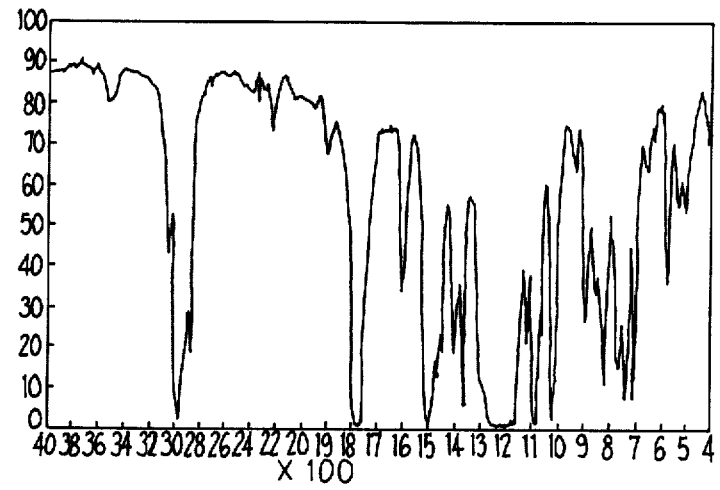
Figure 10:
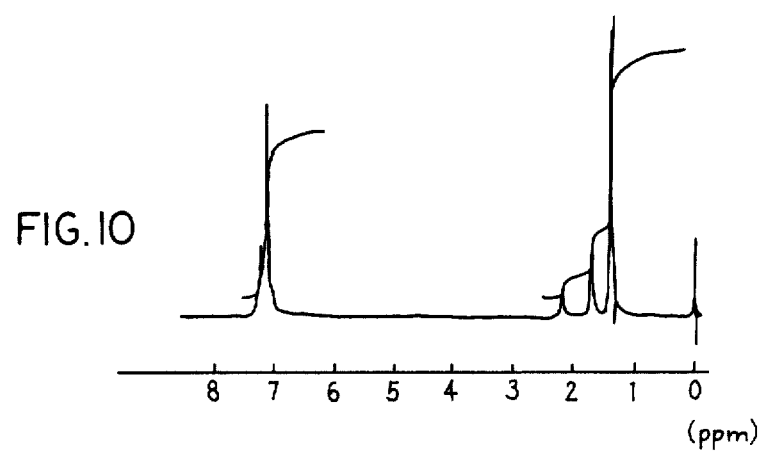

174 parts (50 molar %) of 4,4'-dihydroxy-2,2,2-triphenylethane, 204 parts (50 molar %) of 2,2-bis(4-hydroxy-3-tert-butylphenyl)propane and 264 parts of diphenyl carbonate were placed in a 3-l three-necked flask. After repeating degassing and nitrogen purge five times, the mixture was molten at 160° C. in a silicone bath while nitrogen was introduced thereinto. A solution of potassium borohydride (carbonation catalyst) in phenol prepared previously was added to the melt in an amount of $10^{-3}$ molar % based on the total amount of the bisphenol fed. After aging under stirring at 160° C. in a nitrogen atmosphere for 30 min, the pressure was reduced to 100 Torr at that temperature and the mixture was stirred for 30 min. Further the pressure was reduced to 50 Torr at that temperature and the reaction was continued for additional 60 min. The temperature was elevated slowly to 220° C. and the reaction was conducted for 60 min. The amount of phenol distilled until this step was 80% based on a theoretical amount. Then the pressure was reduced to 10 Torr at that temperature and the reaction was conducted for 30 min. The temperature was elevated slowly to 270° C. and the reaction was conducted for 30 min. Further the pressure was reduced to 5 Torr at that temperature and the reaction was conducted for 30 min. The precondensation was thus completed and a nearly theoretical amount of phenol was distilled until this step. Thereafter the postcondensation reaction was conducted at that temperature under 0.1 to 0.3 Torr for 2 h. The resulting polymer was taken out and colled in a nitrogen atmosphere and its solution viscosity was determined using dichloromethane as the solvent at 20° C. The viscosity-average molecular weight $\overline{M}v$ calculated from the solution viscosity was 16,000. In its IR spectrum, a characteristic absorption of a carbonate bond was observed at 1730 to 1810 cm$^{-1}$ (FIG. 9). In its $^1$H-NMR spectrum, absorptions of hydrogen in the methyl group of a tert-butyl group at 1.36 ppm, hydrogen in the methyl group of propane of 2,2-bis(4-hydroxy-3-tert-butylphenyl)propane at 1.7 ppm, hydrogen in the methyl group of 4,4'-dihydroxy-2,2,2-triphenylethane at 2.2 ppm and a phenyl group at 6.9 to 7.2 ppm were observed (FIG. 10). From the results of the determination with DSC, it was found that the glass transition point Tg was 144° C. The photoelasticity constant C was 38 Brewsters ($10^{-12}$ m$^2$/N). From the integrated value of the NMR chart, it was confirmed that the polymer was a polycarbonate copolymer comprising 4,4'-dihydroxy-2,2,2-triphenylethane and 2,2-bis(4-hydroxy-3-tert-butylphenyl)propane in a ratio of 1:1.

EXAMPLE 10

A three-necked flask was provided with a stirrer, thermometer, gas-inlet tube and gas-outlet tube 174 parts (50 molar %) of 4,4'-dihydroxy-2,2,2-triphenylethane and 204 parts (50 mdlar %) of 2,2-bis(4-hydroxy-3-tert-butylphenyl)propane were dissolved in a 10% aqueous sodium hydroxide solution. Dichloromethane was added to the solution thus prepared. Gaseous phosgene was introduced thereinto under vigorous stirring. Phosgene was introduced from a bomb into the flask through an empty gas washing bottle, a gas washing bottle containing water and an empty gas washing bottle sequentially. The reaction temperature was kept below 25° C. with water during the introduction of gaseous phosgene. As the condensation reaction proceeded, the solution became viscous. Phosgene was introduced thereinto until yellow color of phosgene/-hydrogen chloride complex no more disappeared. After completion of the reaction, the reaction solution was poured into methanol, the mixture was filtered and the filtration residue was washed with water. This procedure was repeated. The polycarbonate thus formed in the form of a solution in dichloromethane was re-precipitated from methanol to purify the same.

After the purification followed by drying, the solution viscosity of the product was determined using dichloromethane as the solvent at 20° C. The viscosity-average molecular weight $\overline{M}v$ calculated from the solution viscosity was 25,000. From the fact that the results similar to those obtained in Example 9 were obtained by the instrumental analysis conducted in the same manner as in Example 9, the formed polymer was identified with a polycarbonate copolymer comprising 4,4'-dihydroxy-2,2,2-triphenylethane and 2,2-bis(4-hydroxy-3-tert-butylphenyl)propane in a ratio of 1:1.

EXAMPLE 11

Figure 11:
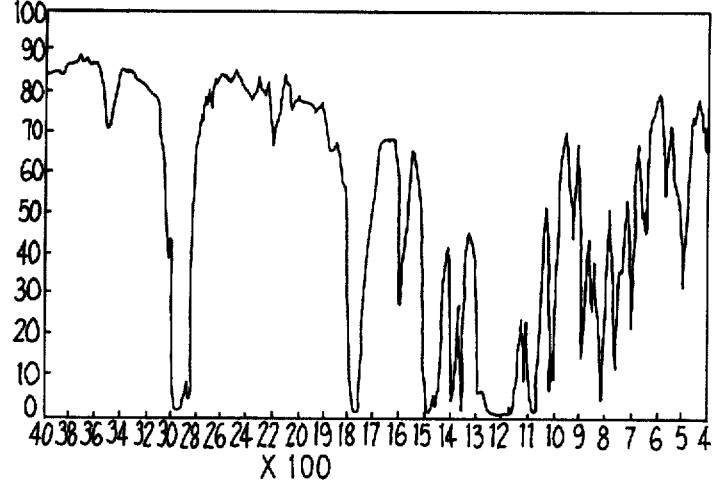
Figure 12:
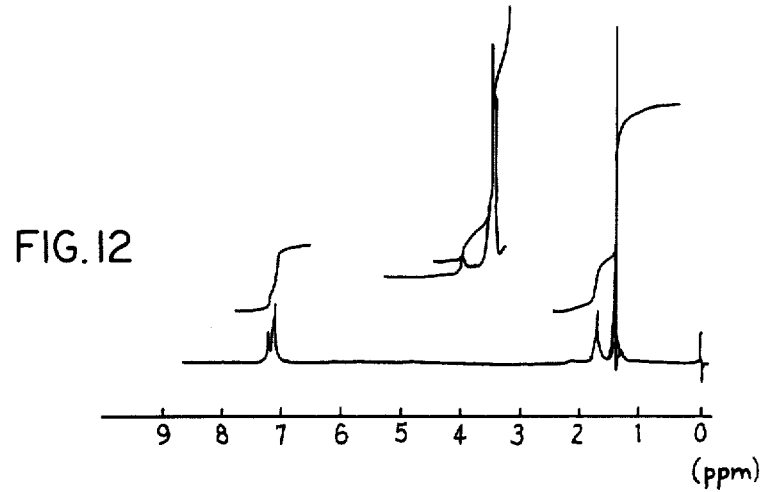

52 parts 15 molar %) of 4,4'-dihydroxy-2,2,2-triphenylethane, 347 parts (85 molar %) of 2,2-bis(4-hydroxy-3-tert-butylphenyl)propane and 264 parts of diphenyl carbonate were placed in a 3-l three-necked flask. After repeating degassing and nitrogen purge five times, the mixture was molten at 160° C. in a silicone bath while nitrogen was introduced thereinto. A solution of potassium borohydride (carbonation catalyst) in phenol prepared previously was added to the melt in an amount of $10^{-3}$ molar % based on the total amount of the bisphenol fed. After aging under stirring at 160° C. in a nitrogen atmosphere for 30 min, the pressure was reduced to 100 Torr at that temperature and the mixture was stirred for 30 min. Further the pressure was reduced to 50 Torr at that temperature and the reaction was continued for additional 60 min. The temperature was elevated slowly to 220° C. and the reaction was conducted for 60 min. The amount of phenol distilled until this step was 80% based on a theoretical amount. Then the pressure was reduced to 10 Torr at that temperature and the reaction was conducted for 30 min. The temperature was elevated slowly to 270° C. and the reaction was conducted for 30 min. Further the pressure was reduced to 5 Torr at that temperature and the reaction was conducted for 30 min. The precondensation was thus completed and a nearly theoretical amount of phenol was distilled until this step. Thereafter the postcondensation reaction was conducted at that temperature under 0.1 to 0.3 Torr for 2 h. The resulting polymer was taken out and cooled in a nitrogen atmosphere and its solution viscosity was determined using dichloromethane as the solvent at 20° C. The viscosity-average molecular weight $\overline{M}v$ calculated from the solution viscosity was 14,000. In its IR spectrum, a characteristic absorption of a carbonate bond was observed at 1710 to 1810 cm$^{-1}$ (FIG. 11). In its $^1$H-NMR spectrum, absorptions of hydrogen in the methyl group of a tert-butyl group at 1.36 ppm, hydrogen in the methyl group of propane of 2,2-bis(4-hydroxy-3-tert-butylphenyl)propane at 1.7 ppm, hydrogen in the methyl group of 4,4'-dihydroxy-2,2,2-triphenylethane at 2.2 ppm and a phenyl group at 7.0 to 7.3 ppm were observed (FIG. 12). From the results of the determination with DSC, it was found that the glass transition point Tg was 125° C. The photoelasticity constant C was 20 Brewsters (10$^{-12}$ m$^2$/N). From the integrated value of the NMR chart, it was confirmed that the polymer was a polycarbonate copolymer comprising 4,4'-dihydroxy-2,2,2-triphenylethane and 2,2-bis(4-hydroxy-3-tert-butylphenyl)propane in a ratio of 3:17.

EXAMPLE 12

A three-necked flask was provided with a stirrer, thermometer, gas-inlet tube and gas-outlet tube. 52 parts (15 molar %) of 4,4'-dihydroxy-2,2,2-triphenylethane and 347 parts (85 molar %) of 2,2-bis(4-hydroxy-3-tert-butylphenyl)propane were dissolved in a 10% aqueous sodium hydroxide solution. Dichloromethane was added to the solution thus prepared. Gaseous phosgene was introduced thereinto under vigorous stirring. Phosgene was introduced from a bomb into the flask through an empty gas washing bottle, a gas washing bottle containing water and an empty gas washing bottle sequentially. The reaction temperature was kept below 25° C. with water during the introduction of gaseous phosgene. As the condensation reaction proceeded, the solution became viscous. Phosgene was introduced thereinto until yellow color of phosgene/hydrogen chloride complex no more disappeared. After completion of the reaction, the reaction solution was poured into methanol, the mixture was filtered and the filtration residue was washed with water. This procedure was repeated. The polycarbonate thus formed in the form of a solution in dichloromethane was reprecipitated from methanol to purify the same.

After the purification followed by drying, the solution viscosity of the product was determined using dichloromethane as the solvent at 20° C. The viscosity-average molecular weight $\overline{M}v$ calculated from the solution viscosity was 25,000. From the fact that the results similar to those obtained in Example 11 were obtained by the instrumental analysis conducted in the same manner as in Example 11, the formed polymer was identified with a polycarbonate copolymer comprising 4,4'-dihydroxy-2,2,2-triphenylethane and 2,2-bis(4-hydroxy-3-tert-butylphenyl)propane in a ratio of 3:17.

EXAMPLE 13

Figure 13:
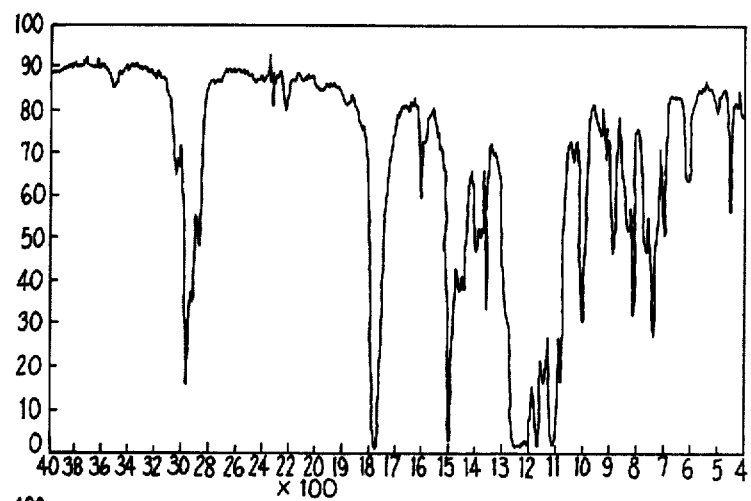
Figure 14:
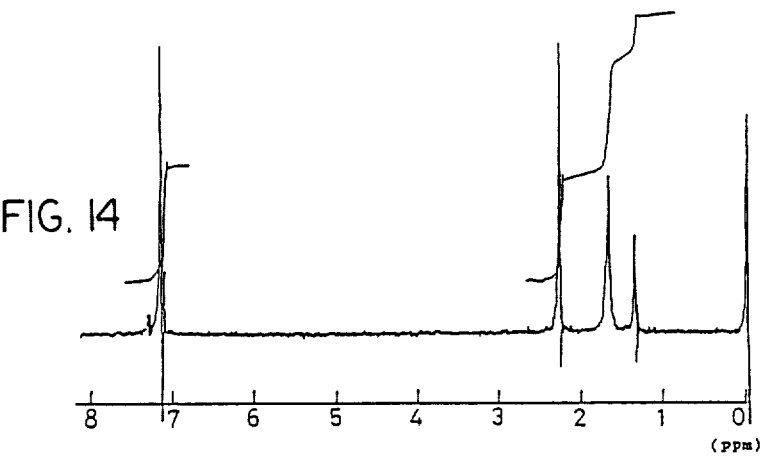

277 parts (90 molar %) of 2,2-bis-(4-hydroxy-3-methylphenyl)propane, 41 parts (10 molar %) of 2,2-bis(4-hydroxy-3-tert-butylphenyl)propane and 264 parts of diphenyl carbonate were placed in a 3-l three-necked flask. After repeating degassing and nitrogen purge five times, the mixture was molten at 160° C. in a silicone bath while nitrogen was introduced thereinto. A solution of potassium borohydride (carbonation catalyst) in phenol prepared previously was added to the melt in an amount of 10$^{-3}$ molar % based on the total amount of the bisphenol fed. After aging under stirring at 160° C. in a nitrogen atmosphere for 30 min, the pressure was reduced to 100 Torr at that temperature and the mixture was stirred for 30 min. Further the pressure was reduced to 50 Torr at that temperature and the reaction was continued for additional 30 min. The temperature was elevated slowly to 220° C. and the reaction was conducted for 60 min to distill phenol in an amount of 80% based on a theoretical amount. Then the pressure was reduced to 10 Torr at that temperature and the reaction was conducted for 30 min. The temperature was elevated slowly to 270° C. and the reaction was conducted for 30 min. Further the pressure was reduced to 5 Torr at that temperature and the reaction was conducted for 30 min. The precondensation was thus completed and a nearly theoretical amount of phenol was distilled until this step. Thereafter the postcondensation reaction was conducted at that temperature under 0.1 to 0.3 Torr for 2 h. The resulting polymer was taken out and cooled in a nitrogen atmosphere and its solution viscosity was determined using dichloromethane as the solvent at 20° C. The viscosity-average molecular weight $\overline{M}v$ calculated from the solution viscosity was 27,000. In its IR spectrum, a characteristic absorption of a carbonate bond was observed at 1750 to 1800 cm$^{-1}$ FIG. 13). In its $^1$H-NMR spectrum, absorptions due to hydrogen in the methyl group of a tert-butyl group at 1.36 ppm, hydrogen in the methyl group of propane at 1.68 ppm and a phenyl group at 7.20 to 7.36 ppm were observed (FIG. 14). From the results of the determination with a DSC (differential scanning calorimeter; Perkin-Elmer 2C), it was found that the glass transition point Tg was 139° C. The photoelasticity constant C was 60 Brewsters (10$^{-12}$ m$^2$/N). From the integrated value of the NMR chart, it was confirmed that the polymer was a polycarbonate copolymer comprising 2,2-bis(4-hydroxy-3-methylphenyl)propane and 2,2-bis(4-hydroxy-3-tert-butylphenyl)propane in a ratio of 9:1. The devices used in the measurement were an IR spectrometer (IR-810; a product of Nippon Bunkô Co.), a $^1$H-NMR device (JNM-MH-100; a product of JEOL, Ltd.) and a DSC [differential scanning calorimeter (Perkin-Elmer 2C)]. The photoelasticity constant was determined with a device made by the present inventors. The photoelasticity constant was determined by applying various tensile stresses to test pieces (50 mm×10 mm×1 mm) lengthwise, measuring the double refraction, putting the value in the above-mentioned formula (1) and determining the photoelasticity constant from the gradient. The photoelasticity constant of 2,2-bis(4-hydroxyphenyl)propane polycarbonate was 82 Brewsters (10$^{-12}$ m$^2$/N).

EXAMPLE 14

A three-necked flask was provided with a stirrer, thermometer, gas-inlet tube and gas-outlet tube. 277 parts (90 molar %) of 2,2-bis(4-hydroxy-3-methylphenyl)propane and 41 parts (10 molar %) of 2,2-bis(4-hydroxy-3-tert-butylphenyl)propane were dissolved in 10% aqueous sodium hydroxide solution. Dichloromethane was added to the solution thus prepared. Gaseous phosgene was introduced thereinto under vigorous stirring. Phosgene was introduced from a bomb into the flask through an empty gas washing bottle, a gas washing bottle containing water and an empty gas washing bottle sequentially. The reaction temperature was kept below 25° C. with water during the introduction of gaseous phosgene. As the condensation reaction proceeded, the solution became viscous. Phosgene was introduced thereinto until yellow color of phosgene/hydrogen chloride complex no more disappeared. After completion of the reaction, the reaction solution was poured into methanol, the mixture was filtered and the filtration residue was washed with water. This procedure was repeated. The polycarbonate thus formed in the form of a solution in dichloromethane was re-precipitated from methanol to purify the same. After the purification followed by drying, the solution viscosity of the product was determined using dichloromethane as the solvent at 20° C. The viscosity-average molecular weight $\overline{M}v$ calculated from the solution viscosity was 31,000. From the fact that the results similar to those obtained in Example 13 were obtained by the instrumental analysis conducted in the same manner as in Example 13, the formed polymer was identified with a polycarbonate copolymer comprising 2,2-bis-(4-hydroxy-3-methylphenyl)propane and 2,2-bis(4-hydroxy-3-tert-butylphenyl)propane in a ratio of 9:1.

EXAMPLE 15

Figure 15:
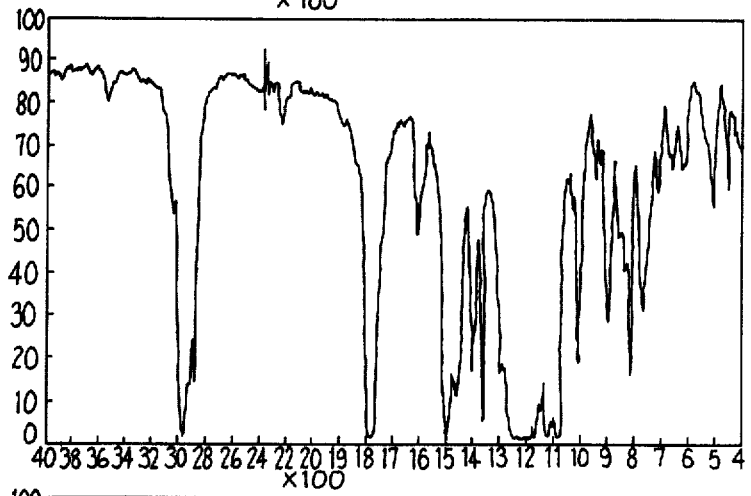
Figure 16:
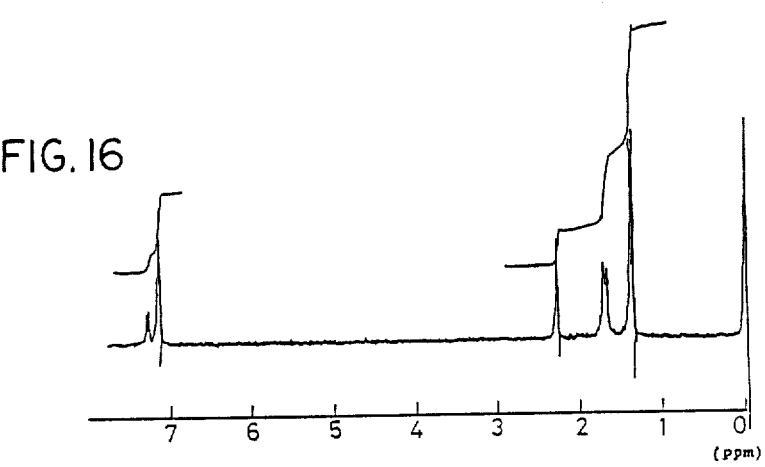

154 parts (50 molar %) of 2,2-bis-(4-hydroxy-3-methylphenyl)propane, 204 parts (50 molar %) of 2,2-bis(4-hydroxy-3-tert-butylphenyl)propane and 264 parts of diphenyl carbonate were placed in a 3-l three-necked flask. After repeating degassing and nitrogen purge five times, the mixture was molten at 160° C. in a silicone bath while nitrogen was introduced thereinto. A solution of potassium borohydride (carbonation catalyst) in phenol prepared previously was added to the melt in an amount of $10^{-3}$ molar % based on the total amount of the bisphenol fed. After aging under stirring at 160° C. in a nitrogen atmosphere for 30 min, the pressure was reduced to 100 Torr at that temperature and the mixture was stirred for 30 min. Further the pressure was reduced to 50 Torr at that temperature and the reaction was continued for additional 60 min. The temperature was elevated slowly to 220° C. and the reaction was conducted for 60 min. The amount of phenol distilled until this step was 80% based on a theoretical amount. Then the pressure was reduced to 10 Torr at that temperature and the reaction was conducted for 30 min. The temperature was elevated slowly to 270° C. and the reaction was conducted for 30 min. Further the pressure was reduced to 5 Torr at that temperature and the reaction was conducted for 30 min. The precondensation was thus completed and a nearly theoretical amount of phenol was distilled until this step. Thereafter the postcondensation reaction was conducted at that temperature under 0.1 to 0.3 Torr for 2 h. The resulting polymer was taken out and cooled in a nitrogen atmosphere and its solution viscosity was determined using dichloromethane as the solvent at 20° C. The viscosity-average molecular weight $\overline{M}v$ calculated from the solution viscosity was 27,000. In its IR spectrum, a characteristic absorption of a carbonate bond was observed at 1740 to 1810 cm$^{-1}$ (FIG. 15). In its $^1$H-NMR spectrum, absorption due to hydrogen in the methyl group of a tert-butyl group at 1.36 ppm, hydrogen in the methyl group of propane at 1.68 ppm, hydrogen in a methyl group at 2.30 ppm and a phenyl grou at 7.20 to 7.40 ppm were observed (FIG. 16). From the results of the determination with DSC, it was understood that the glass transition point Tg was 120° C. The photoelasticity constant C was 40 Brewsters ($10^{-12}$ m$^2$/N) From the integrated value of the NMR chart, it was confirmed that the polymer was a polycarbonate copolymer comprising 2,2-bis(4-hydroxy-3-methylphenyl)propane and 2,2-bis(4-hydroxy-3-tert-butylphenyl)propane in a ratio of 1:1.

EXAMPLE 16

A three-necked flask was provided with a stirrer, thermometer, gas-inlet tube and gas-outlet tube. 154 parts (50 molar %) of 2,2-bis(4-hydroxy-3-methylphenyl)propane and 204 parts (50 molar %) of 2,2-bis(4-hydroxy-3-tert-butylphenyl)propane were dissolved in 10% aqueous sodium hydroxide solution. Dichloromethane was added to the solution thus prepared. Gaseous phosgene was introduced thereinto under vigorous stirring. Phosgene was introduced from a bomb into the flask through an empty gas washing bottle, a gas washing bottle conaining water and an empty gas washing bottle sequentially. The reaction temperature was kept below 25° C. with water during the introduction of gaseous phosgene. As the condensation reaction proceeded, the solution became viscous. Phosgene was introduced thereinto until yellow color of phosgene/hydrogen chloride complex no more disappeared. After completion of the reaction, the reaction solution wss poured into methanol, the mixture was filtered and the filtration residue was washed with water. This procedure was repeated. The polycarbonate thus formed in the form of a solution in dichloromethane was re-precipitated from methanol to purify the same. After the purification followed by drying, the solution viscosity of the product was determined using dichloromethane as the solvent at 20° C. The viscosity-average molecular weight $\overline{M}v$ calculated from the solution viscosity was 29,000. From the fact that the results similar to those obtained in Example 15 were obtained by the instrumental analysis conducted in the same manner as in Example 15, the formed polymer was identified with a polycarbonate copolymer comprising 2,2-bis-(4-hydroxy-3-methylphenyl)propane and 2,2-bis(4-hydroxy-3-tert-butylphenyl)propane in a ratio of 1:1.

EXAMPLE 17

Figure 17:
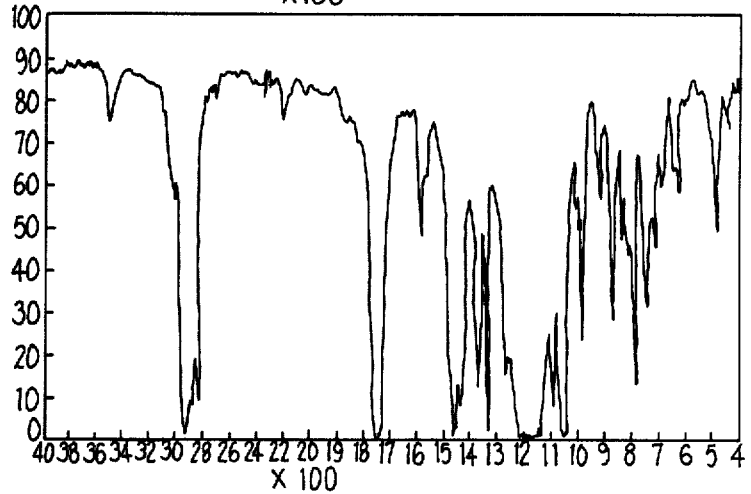
Figure 18:
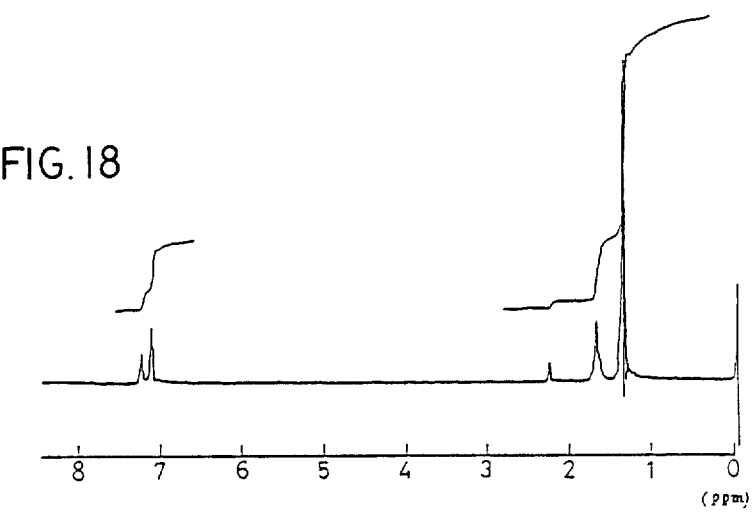

46 parts (15 molar %) of 2,2-bis-(4-hydroxy-3-methylphenyl)propane, 347 parts (80 molar %) of 2,2-bis(4-hydroxy-3-tert-butylphenyl)propane and 264 parts of diphenyl carbonate were placed in a 3-l three-necked flask. After repeating degassing and nitrogen purge five times, the mixture was molten at 160° C. in a silicone bath while nitrogen was introduced thereinto. A solution of potassium borohydride (carbonation catalyst) in phenol prepared previously was added to the melt in an amount of $10^{-3}$ molar % based on the total amount of the bisphenol fed. After aging under stirring at 160° C. in a nitrogen atmosphere for 30 min, the pressure was reduced to 100 Torr at that temperature and the mixture was stirred for 30 min. Further the pressure was reduced to 50 Torr at that temperature and the reaction was continued for additional 60 min. The temperature was elevated slowly to 220° C. and the reaction was conducted for 60 min. The amount of phenol distilled until this step was 80% based on a theoretical amount. Then the pressure was reduced to 10 Torr at that temperature and the reaction was conducted for 30 min. The temperature was elevated slowly to 270° C. and the reaction was conducted for 30 min. Further the pressure was reduced to 5 Torr at that temperature and the reaction was conducted for 30 min. The precondensation was thus completed and a nearly theoretical amount of phenol was distilled until this step. Thereafter the postcondensation reaction was conducted at that temperature under 0.1 to 0.3 Torr for 2 h. The resulting polymer was taken out and cooled in a nitrogen atmosphere and its solution viscosity was determined using dichloromethane as the solvent at 20° C. The viscosity-average molecular weight $\overline{M}v$ calculated from the solution viscosity was 18,000. In its IR spectrum, a characteristic absorption of a carbonate bond was observed at 1740 to 1805 cm$^{-1}$ (FIG. 17). In its $^1$H-NMR spectrum, absorption due to hydrogen in the methyl group of a tert-butyl group at 1.36 ppm, hydrogen in the methyl group of propane at 1.68 ppm, hydrogen in a methyl group at 2.30 ppm and a phenyl group at 7.20 to 7.30 ppm were observed (FIG. 18). From the results of the determination with DSC, it was found that the glass transition point Tg was 119° C. The photoelasticity constant C was 28 Brewsters (10$^{-12}$ m$^2$/N). From the integrated value of the NMR chart, it was confirmed that the polymer was a polycarbonate copolymer comprising 2,2-bis(4-hydroxy-3methylphenyl)propane and 2,2-bis(4-hydroxy-3-tertbutylphenyl)propane in a ratio of 3:17.

EXAMPLE 18

A three-necked flask was provided with a stirrer, thermometer, gas-inlet tube and gas-outlet tube. 46 parts (15 molar %) of 2,2-bis(4-hydroxy-3-methylphenyl)propane and 347 parts (85 molar %) of 2,2-bis(4-hydroxy-3-tert-butylphenyl)propane were dissolved in 10% aqueous sodium hydroxide solution. Dichloromethane was added to the solution thus prepared. Gaseous phosgene was introduced thereto under vigorous stirring Phosgene was introdued from a bomb into the flask through an empty gas washing bottle, a gas whasing bottle containing water and an empty gas washing bottle sequentially. The reaction temperature was kept below 25° C. with water during the introduction of gaseous phosgene As the condensation reaction proceeded, the solution became viscous. Phosgene was introduced thereinto until yellow color of phosgene/hydrogen chloride complex no more disappeared. After completion of the reaction, the reaction solution was poured into methanol, the mixture was filtered and the filtration residue was washed with water. This procedure was repeated. The polycarbonate thus formed in the form of a solution in dichloromethane was reprecipitated from methanol to purity the same. After the purification followed by drying, the solution viscosity of the product was determined using dichloromethane as the solvent at 20° C. The viscosity-average molecular weight $\overline{M}v$ calculated from the solution viscosity was 20,000. From the fact that the results similar to those obtained in Example 17 were obtained by the instrumental analysis conducted in the same manner as in example 17, the formed polymer was identified with a polycarbonate copolymer comprising 2,2-bis-(4-hydroxy-3-methylphenyl)propane and 2,2-bis(4-hydroxy-3-tertbutylphenyl)propane in a ratio of 3:17.

EXAMPLE 19

Figure 19:
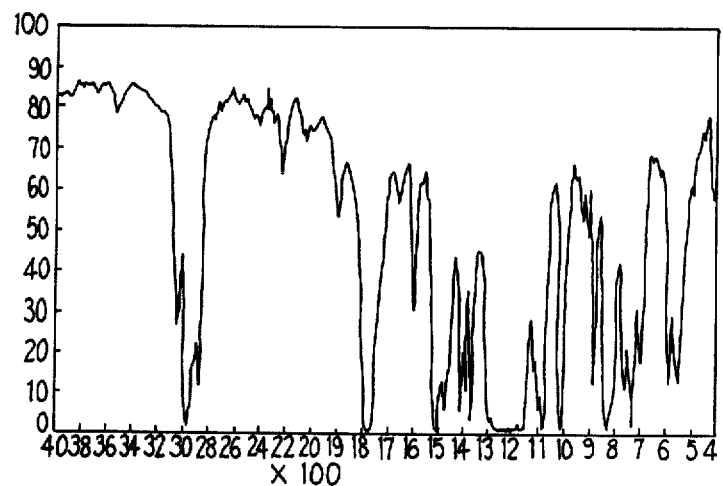
Figure 20:
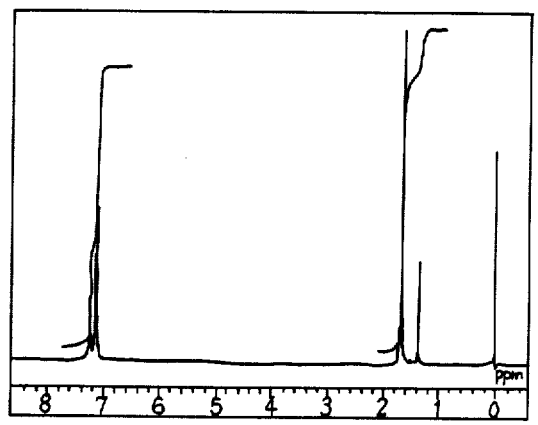

374 parts (90 molar %) of 1,1'-bis(4-hydroxyphenyl)-p-diisopropylbenzene, 41 parts (10 molar %) of 2,2-bis(4-hydroxy-3-tert-butylphenyl)propane and 264 parts of diphenyl carbonate were placed in a 3-l three-necked flask. After repeating degassing and nitrogen purge five times, the mixture was molten at 160° C. in a silicone bath while nitrogen was introduced thereinto. A solution of potassium borohydride (carbonation catalyst) in phenol prepared previously was added to the melt in an amount of 10$^{-3}$ molar % based on the total amount of the bisphenol fed. After aging under stirring at 160° C. in a nitrogen atmosphere for 30 min, the pressure was reduced to 100 Torr at that temperature and the mixture was stirred for 30 min. Further the pressure was reduced to 50 Torr at that temperature and the reaction was continued for additional 30 min. The temperature was elevated slowly to 220° C. and the reaction was conducted for 60 min to distill phenol in an amount of 80 % based on a theoretical amount. Then the pressure was reduced to 10 Torr at that temperature and the reaction was conducted for 30 min. The temperature was elevated slowly to 270° C. and the reaction was conducted for 30 min. Further the pressure was reduced to 5 Torr at that temperature and the reaction was conducted for 30 min. The precondensation was thus completed and a nearly theoretical amount of phenol was distilled until this step. Thereafter the postcondensation reaction was conducted at that temperature under 0.1 to 0.3 Torr for 2 h. The resulting polymer was taken out and cooled in a nitrogen atmosphere and its solution viscosity was determined using dichloromethane as the solvent at 20° C. The viscosity-average molecular weight $\overline{M}v$ calculated from the solution viscosity was 24,000. In its IR spectrum, a characteristic absorption of a carbonate bond was observed at 1720 to 1820 cm$^{-1}$ (FIG. 19). In its $^1$H-NMR spectrum, absorptions of hydrogen in the methyl group of a tert-butyl group at 1.34 and 1.38 ppm, hydrogen of the methyl group of propane at 1.65 and 1.68 ppm and a phenyl group at 7.04 to 7.34 ppm were observed (FIG. 20). From the results of the determination with DSC (differential scanning calorimeter; Perkin-Elmer 2C), it was found that the glass transition point Tg was 146° C. The photoelasticity constant C was 56 Brewsters (10$^{-12}$ m$^2$/N). From the integrated value of the NMR chart, it was confirmed that the polymer was a polycarbonate copolymer comprising 1,1'-bis(4-hydroxyphenyl)-p-diisopropylbenzene and 2,2-bis(4-hydroxy-3-tertbutylphenyl)-propane in a ratio of 9:1.

The devices used in the measurement were an IR spectrometer (IR-810; a product of Nippon Bunkô Co.), a $^1$H-NMR device JNM-GX-270 (a product of JEOL, Ltd.) and a DSC [(differential scanning calorimeter (Perkin-Elmer 2C) ]. The photoelasticity constant was determined with a device made by the present inventors. The photoelasticity constant was determined by applying various tensile stresses to test pieces (50 mm × 10 mm × 1 mm) lengthwise, measuring the double refraction, putting the value in the above-mentioned formula (1) and determining the photoelasticity constant from the gradient. The photoelasticity constant of 2,2-bis(4-hydroxyphenyl)propane polycarbonate was 82 Brewsters (10$^{-12}$ m$^2$/N).

EXAMPLE 20

A three-necked flask was provided with a stirrer, thermometer, gas-inlet tube and gas-outlet tube. 374 parts (90 molar %) of 1,1'-bis(4-hydroxyphenyl)-p-diisopropylbenzene and 41 parts (10 molar %) of 2,2-bis(4-hydroxy-3-tert-butylphenyl)propane were dissolved in a 10% aqueous sodium hydroxide solution. Dichloromethane was added to the solution thus prepared. Gaseous phosgene was introduced thereinto under vigorous stirring. Phosgene was introduced from a bomb into the flask through an empty gas washing bottle, a gas washing bottle containing water and an empty gas washing bottle sequentially. The reaction temperature was kept below 25° C. with water during the introduction of gaseous phosgene. As the condensation reaction proceeded, the solution became viscous. Phosgene was introduced thereinto until yellow color of phosgene/hydrogen chloride comprex no more disappeared. After completion of the reaction, the reaction solution was poured into methanol, the mixture was filtered and the filtration residue was washed with water. This procedure was repeated. The polycarbonate thus formed in the form of a solution in dichloromethane was reprecipitated from methanol to purify the same.

After the purification followed by drying, the solution viscosity of the product was determined using dichloromethane as the solvent at 20° C. The viscosity-average molecular weight $\overline{M}v$ calculated from the solution viscosity was 29,000. From the fact that the results similar to those obtained in Example 19 were obtained by the instrumental analysis conducted in the same manner as in Example 19, the formed polymer was identified with a polycarbonate copolymer comprising 1,1'-bis(4-hydroxyphenyl)-p-diisopropylbenzene and 2,2-bis(4-hydroxy-3-tertbutylphenyl)propane in a ratio of 9:1.

EXAMPLE 21

Figure 21:
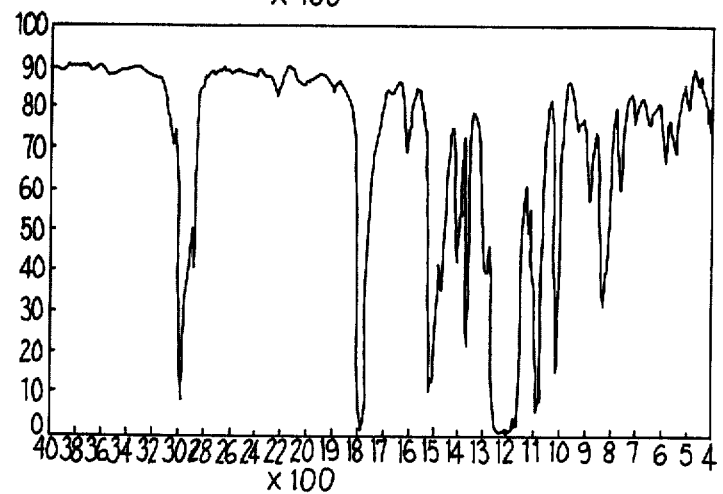
Figure 22:
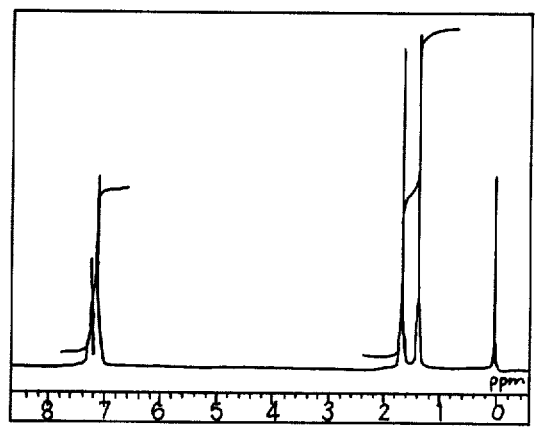

208 parts (50 molar %) of 1,1'-bis(4-hydroxyphenyl)-p-diisopropylbenzene, 204 parts (50 molar %) of 2,2-bis(4-hydroxy-3-tert-butylphenyl)propane and 264 parts of diphenyl carbonate were placed in a 3-l three-necked flask. After repeating degassing and nitrogen purge five times, the mixture was molten at 160° C. in a silicone bath while nitrogen was introduced thereinto. A solution of potassium borohydride (carbonation catalyst) in phenol prepared previously was added to the melt in an amount of $10^{-3}$ molar % based on the total amount of the bisphenol fed. After aging under stirring at 160° C. in a nitrogen atmosphere for 30 min, the pressure was reduced to 100 Torr at that temperature and the mixture was stirred for 30 min. Further the pressure was reduced to 50 Torr at that temperature and the reaction was continued for additional 60 min. The temperature was elevated slowly to 220° C. and the reaction was conducted for 60 min. The amount of phenol distilled until this step was 80% based on a theoretical amount. Then the pressure was reduced to 10 Torr at that temperature and the reaction was conducted for 30 min. The temperature was elevated slowly to 270° C. and the reaction was conducted for 30 min. Further the pressure was reduced to 5 Torr at that temperature and the reaction was conducted for 30 min. The precondensation was thus completed and a nearly theoretical amount of phenol was distilled until this step. Thereafter the postcondensation reaction was conducted at that temperature under 0.1 to 0.3 Torr for 2 h. The resulting polymer was taken out and cooled in a nitrogen atmosphere and its solution viscosity was determined using dichloromethane as the solvent at 20° C. The viscosity-average molecular weight $\overline{M}v$ calculated from the solution viscosity was 25,000. In its IR spectrum, a characteristic absorption of a carbonate bond was observed at 1760 to 1800 cm$^{-1}$ (FIG. 21). In its $^1$H-NMR spectrum, absorptions of hydrogen in the methyl group of a tert-butyl group at 1.34 and 1.38 ppm, hydrogen in the methyl group of propane at 1.65 and 1.68 ppm and a phenyl group at 7.02 to 7.30 ppm were observed (FIG. 22). From the results of the determination with DSC, it was found that the glass transition point Tg was 136° C. The photoelasticity constant C was 41 Brewsters ($10^{-12}$ m$^2$/N). From the integrated value of the NMR chart, it was confirmed that the polymer was a polycarbonate comprising 1,1'-bis(4-hydroxyphenyl)-p-diisopropylbenzene and 2,2-bis(4-hydroxy-3-tert-butylphenyl)propane in a ratio of 1:1.

EXAMPLE 22

A three-necked flask was provided with a stirrer, thermometer, gas-inlet tube and gas-outlet tube. 208 parts (50 molar %) of 1,1'-bis(4-hydroxyphenyl)-p-diisopropylbenzene and 204 parts (50 molar %) of 2,2-bis(4-hydroxy-3-tert-butylphenyl)propane were dissolved in a 10% aqueous sodium hydroxide solution. Dichloromethane was added to the solution thus prepared. Gaseous phosgene was introduced thereinto under vigorous stirring. Phosgene was introduced from a bomb into the flask through an empty gas-washing bottle, a gas washing bottle containing water and an empty gas washing bottle sequentially. The reaction temperature was kept below 25° C. with water during the introduction of gaseous phosgene. As the condensation reaction proceeded, the solution became viscous. Phosgene was introduced thereinto until yellow color of phosgene/hydrogen chloride comprex no more disappeared. After completion of the reaction, the reaction solution was poured into methanol, the mixture was filtered and the filtration residue was washed with water. This procedure was repeated. The polycarbonate thus formed in the form of a solution in dichloromethane was reprecipitated from methanol to purify the same.

After the purification followed by drying, the solution viscosity of the product was determined using dichloromethane as the solvent at 20° C. The viscosity-average molecular weight $\overline{M}v$ calculated from the solution viscosity was 28,000. From the fact that the results similar to those obtained in Example 21 were obtained by the instrumental analysis conducted in the same manner as in Example 21, the formed polymer was identified with a polycarbonate copolymer comprising 1,1'-bis(4-hydroxyphenyl)-p-diisopropylbenzene and 2,2-bis(4-hydroxy-3-tertbutylphenyl)propane in a ratio of 1:1.

EXAMPLE 23

63 parts (15 molar %) of 1,1'-bis(4-hydroxyphenyl)-p-diisopropylbenzene, 347 parts (85 molar %) of 2,2-bis(4-hydroxy-3-tert-butylphenyl)propane and 264 parts of diphenyl carbonate were placed in a 3-l three-necked flask. After repeating degassing and nitrogen purge five times, the mixture was molten at 160° C. in a silicone bath while nitrogen was introduced thereinto. A solution of potassium borohydride (carbonation catalyst) in phenol prepared previously was added to the melt in an amount of $10^{-3}$ molar % based on the total amount of the bisphenol fed. After aging under stirring at 160° C. in a nitrogen atmosphere for 30 min, the pressure was reduced to 100 Torr at that temperature and the mixture was stirred for 30 min. Further the pressure was reduced to 50 Torr at that temperature and the reaction was continued for additional 60 min. The temperature was elevated slowly to 220° C. and the reaction was conducted for 60 min. The amount of phenol distilled until this step was 80% based on a theoretical amount. Then the pressure was reduced to 10 Torr at that temperature and the reaction was conducted for 30 min.

Figure 23:
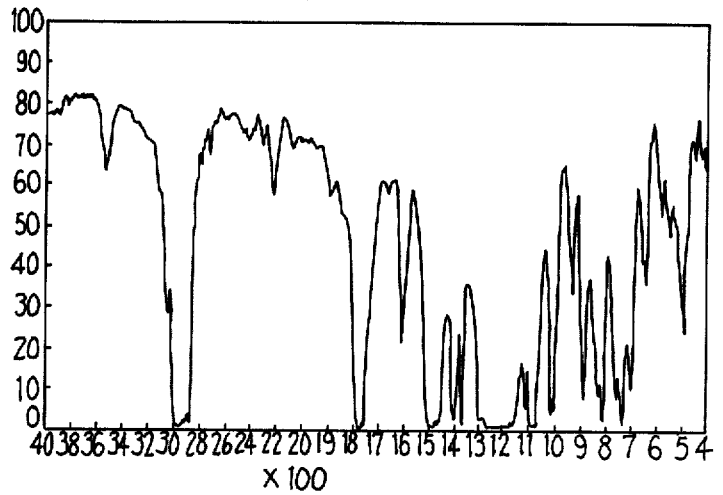
Figure 24:
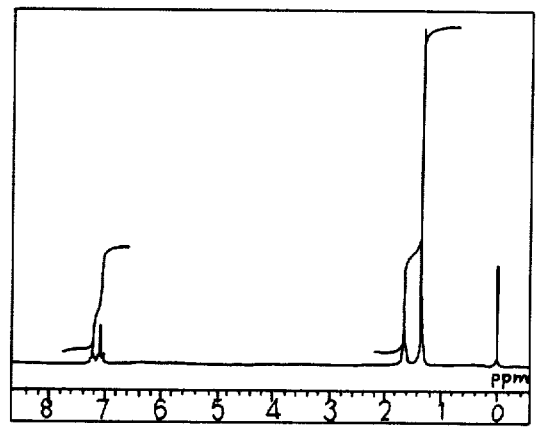

The temperature was elevated slowly to 270° C. and the reaction was conducted for 30 min. Further the pressure was reduced to 5 Torr at that temperature and the reaction was conducted for 30 min. The precondensation was thus completed and a nearly theoretical amount of phenol was distilled until this step. Thereafter the postcondensation reaction was conducted at that temperature under 0.1 to 0.3 Torr for 2 h. The resulting polymer was taken out and cooled in a nitrogen atmosphere and its solution viscosity was determined using dichloromethane as the solvent at 20° C. The viscosity-average molecular weight $\overline{M}v$ calculated from the solution viscosity was 18,000. In its IR spectrum, a characteristic absorption of a carbonate bond was observed at 1710 to 1820 cm$^{-1}$ (FIG. 23). In its $^1$H-NMR spectrum, absorption of hydrogen in the methyl group of a tert-butyl group at 1.34 and 1.38 ppm, hydrogen of the methyl group of propane at 1.65 and 1.68 ppm and a phenyl group at 7.05 to 7.30 ppm were observed (FIG. 24). From the results of the observation with DSC, it was found that the glass transition point Tg was 126° C. The photoelasticity constant C was 25 Brewsters ($10^{-12}$ m$^2$/N). From the integrated value of the NMR chart, it was confirmed that the polymer was a polycarbonate copolymer comprising 1,1'-bis(4-hydroxyphenyl)-p-diisopropylbenzene and 2,2-bis(4-hydroxy-3-tert-butylphenyl)propane in a ratio of 3:17.

EXAMPLE 24

A three-necked flask was provided with a stirrer, thermometer, gas-inlet tube and gas-outlet tube. 63 parts (15 molar %) of 1,1'-bis(4-hydroxyphenyl)-p-diisopropybenzene and 347 parts (85 molar %) of 2,2-bis(4-hydroxy-3-tert-butylphenyl)propane were dissolved in a 10% aqueous sodium hydroxide solution. Dichloromethane was added to the solution thus prepared. Gaseous phosgene was introduced thereinto under vigorous stirring. Phosgene was introduced from a bomb into the flask through an empty gas-washing bottle, a gas washing bottle containing water and an empty gas washing bottle sequentially. The reaction temperature was kept below 25° C. with water during the introduction of gaseous phosgene. As the condensation reaction proceeded, the solution became viscous. Phosgene was introduced thereinto until yellow color of phosgene/-hydrogen chloride comprex no more disappeared. After completion of the reaction, the reaction solution was poured into methanol, the mixture was filtered and the filtration residue was washed with water. This proeedure was repeated. The polycarbonate thus formed in the form of a solution in dichloromethane was re-precipitated from methanol to purify the same.

After the purification followed by drying, the solution viscosity of the product was determined using dichloromethane as the solvent at 20° C. The viscosity-average molecular weight $\overline{M}v$ calculated from the solution viscosity was 23,000. From the fact that the results similar to those obtained in Example 23 were obtained by the instrumental analysis conducted in the same manner as in Example 23, the formed polymer was identified with a polycarbonate copolymer comprising 1,1'-bis(4-hydroxyphenyl)-p-diisopropylbenzene and 2,2-bis(4-hydroxy-3-tert-butylphenyl)propane in a ratio of 3:17.

EXAMPLE 25

Figure 25:
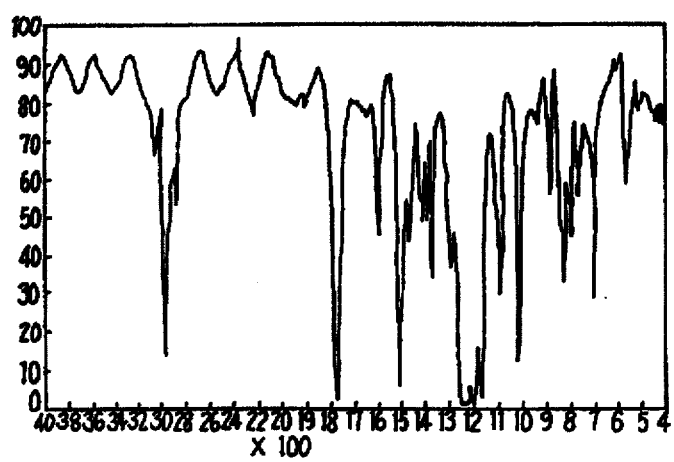
Figure 26:
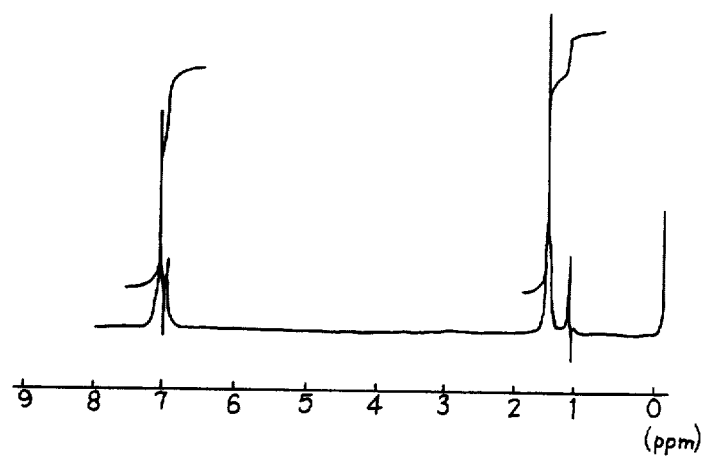

374 parts (90 molar %) of 1,1'-bis(4-hydroxyphenyl)-m-diisopropylbenzene, 41 parts (10 molar %) of 2,2-bis(4-hydroxy-3-tert-butylphenyl)propane and 264 parts of diphenyl carbonate were placed in a 3-l three-necked flask. After repeating degassing and nitrogen purge five times, the mixture was molten at 160° C. in a silicone bath while nitrogen was introduced thereinto. A solution of potassium borohydride (carbonation catalyst) in phenol prepared previously was added to the melt in an amount of 10$^{-3}$ molar % based on the total amount of the bisphenol fed. After aging under stirring at 160° C. in a nitrogen atmosphere for 30 min, the pressure was reduced to 100 Torr at that temperature and the mixture was stirred for 30 min. Further the pressure was reduced to 50 Torr at that temperature and the reaction was continued for additional 30 min. The temperature was elevated slowly to 220° C. and the reaction was conducted for 60 min to distill phenol in an amount of 80% based on a theoretical amount. Then the pressure was reduced to 10 Torr at that temperature and the reaction was conducted for 30 min. The temperature was elevated slowly to 270° C. and the reaction was conducted for 30 min. Further the pressure was reduced to 5 Torr at that temperature and the reaction was conducted for 30 min. The precondensation was thus completed and a nearly theoretical amount of phenol was distilled until this step. Thereafter the postcondensation reaction was conducted at that temperature under 0.1 to 0.3 Torr for 2 h. The resulting polymer was taken out and cooled in a nitrogen atmosphere and its solution viscosity was determined using dichloromethane as the solvent at 20° C. The viscosity-average molecular weight $\overline{M}v$ calculated from the solution viscosity was 25,000. In its IR spectrum, a characteristic absorption of a carbonate bond was observed at 1760 to 1800 cm$^{-1}$ (FIG. 25). In its $^1$H-NMR spectrum, absorptions of hydrogen in the methyl group of a tert-butul group at 1.37 ppm, hydrogen in the methyl group of propane at 1.64 ppm and a phenyl group at 6.80 to 7.25 ppm were observed (FIG. 26). From the results of the determination with DSC (differential scanning calorimeter; Perkin-Elmer 2C), it was found that the glass transition point Tg was 103° C. The photoelasticity constant C was 60 Brewsters ($10^{-12}$ m$^2$/N). From the integrated value of the NMR chart, it was confirmed that the polymer was a polycarbonate copolymer comprising 1,1'-bis(4-hydroxyphenyl)-m-diisopropylbenzene and 2,2-bis(4-hydroxy-3-tert-butylphenyl)propane in a ratio of 9:1.

The devices used in the measurement were an IR spectrometer (IR-810; a product of Nippon Bunkô Co.), a $^1$H-NMR device JNM-GX-270 (a product of JEOL, Ltd.) and a DSC [(differential scanning calorimeter (Perkin-Elmer 2C)]. The photoelasticity constant was determined with a device made by the present inventors. The photoelasticity constant was determined by applying various tensile stesses to test pieces (50 mm × 10 mm × 1 mm) lengthwise, measuring the double refraction, putting the value in the above-mentioned formula (1) and determining the photoelasticity constant from the gradient. The photoelasticity constant of 2,2-bis(4-hydroxyphenyl)propane polycarbonate was 82 Brewsters ($10^{-12}$ m$^2$/N).

EXAMPLE 26

A three-necked flask was provided with a stirrer, thermometer, gas-inlet tube and gas-outlet tube. 374 parts (90 molar %) of 1,1'-bis(4-hydroxyphenyl)-m-diisopropylbenzene and 41 parts (10 molar %) of 2,2-bis(4-hydroxy-3-tert-butylphenyl)propane were dissolved in a 10% aqueous sodium hydroxide solution. Dichloromethane was added to the solution thus prepared. Gaseous phosgene was introduced thereinto under vigorous stirring. Phosgene was introduced from a bomb into the flask through an empty gas washing bottle, a gas washing bottle containing water and an empty gas washing bottle sequentially. The reaction temperature was kept below 25° C. with water during the introduction of gaseous phosgene. As the condensation reaction proceeded, the solution became viscous. Phosgene was introduced thereinto until yellow color of phosgene/hydrogen chloride complex no more disappeared. After completion of the reaction, the reaction solution was poured into methanol, the mixture was filtered and the filtration residue was washed with water. This procedure was repeated. The polycarbonate thus formed in the form of a solution in dichloromethane was reprecipitated from methanol to purify the same.

After the purification followed by drying, the solution viscosity of the product was determined using dichloromethane as the solvent at 20° C. The viscosity-average molecular weight $\overline{M}v$ calculated from the solution viscosity was 27,500. From the fact that the results similar to those obtained in Example 25 were obtained by the instrumental analysis conducted in the same manner as in Example 25, the formed polymer was identified with a polycarbonate copolymer comprising 1,1'-bis(4-hydroxyphenyl)-m-diisopropylbenzene and 2,2-bis(4-hydroxy-3-tertbutylphenyl)propane in a ratio of 9:1.

EXAMPLE 27

Figure 27:
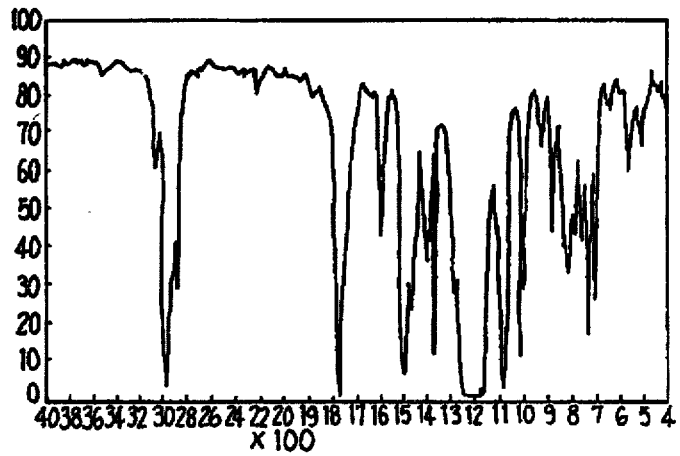
Figure 28:
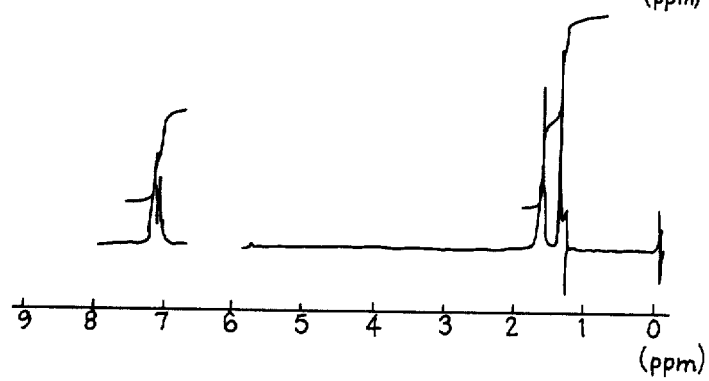

208 parts (50 molar %) 1,1'-his(4-hydroxyphenyl)-m-diisopropylbenzene, 204 parts (50 molar %) of 2,2-bis(4-hydroxy-3-tert-butylphenyl)propane and 264 parts of diphenyl carbonate were placed in a 3-l three-necked flask. After repeating degassing and nitrogen purge five times, the mixture was molten at 160° C. in a silicone bath while nitrogen was introduced thereinto. A solution of potassium borohydride (carbonation catalyst) in phenol prepared previously was added to the melt in an amount of $10^{-3}$ molar % based on the total amount of the bisphenol fed. After aging under stirring at 160° C. in a nitrogen atmosphere for 30 min, the pressure was reduced to 100 Torr at that temperature and the mixture was stirred for 30 min. Further the pressure was reduced to 50 Torr at that temperature and the reaction was continued for additional 60 min. The temperature was elevated slowly to 220° C. and the reaction was conducted for 60 min. The amount of phenol distilled until this step was 80% based on a theoretical amount. Then the pressure was reduced to 10 Torr at that temperature and the reaction was conducted for 30 min. The temperature was elevated slowly to 270° C. and the reaction was conducted for 30 min. Further the pressure was reduced to 5 Torr at that temperature and the reaction was conducted for 30 min. The precondensation was thus completed and a nearly theoretical amount of phenol was distilled until this step. Thereafter the post-condensation reaction was conducted at that temperature under 0.1 to 0.3 Torr for 2 h. The resulting polymer was taken out and cooled in a nitrogen atmosphere and its solution viscosity was determined using dichloromethane as the solvent at 20° C. The viscosity-average molecular weight $\overline{M}v$ calculated from the solution viscosity was 25,000. In its IR spectrum, a characteristic absorption of a carbonate bond was observed at 1750 to 1800 mm$^{-1}$ (FIG. 27). In its $^1$H-NMR spectrum, absorptions of hydrogen in the methyl group of a tert-butyl group at 1.38 ppm, hydrogen in the methyl group of propane at 1.64 and 1.70 ppm and a phenyl group at 6.9 to 7.3 ppm were observed (FIG. 28). From the results of the determination with DSC, it was found that the glass transition point Tg was 111° C. The photoelasticity constant C was 39 Brewsters ($10^{-12}$ m$^2$/N). From the integrated value of the NMR chart, it was confirmed that the polymer was a polycarbonate copolymer comprising 1,1'-bis(4-hydroxyphenyl)-m-diisopropylbenzene and 2,2-bis(4-hydroxy-3-tert-butylphenyl)propane in a ratio of 1:1.

EXAMPLE 28

A three-necked flask was provided with a stirrer, thermometer, gas-inlet tube and gas-outlet tube. 208 parts (50 molar %) of 1,1'-bis(4-hydroxyphenyl)-m-diisopropylbenzene and 204 parts (50 molar %) of 2,2-bis(4-hydroxy-3-tert-butylphenyl)propane were dissolved in a 10% aqueous sodium hydroxide solution. Dichloromethane was added to the solution thus prepared. Gaseous phosgene was introduced thereinto under vigorous stirring. Phosgene was introduced from a bomb into the flask through an empty gas-washing bottle, a gas washing bottle containing water and an empty gas washing bottle sequentially. The reaction temperature was kept below 25° C. with water during the introduction of gaseous phosgene. As the condensation reaction proceeded, the solution became viscous. Phosgene was introduced thereinto until yellow color of phosgene/hydrogen chloride complex no more disappeared. After completion of the reaction, the reaction solution was poured into methanol, the mixture was filtered and the filtration residue was washed with water. This procedure was repeated. The polycarbonate thus formed in the form of a solution in dichloromethane was reprecipitated from methanol to purify the same.

After the purification followed by drying, the solution viscosity of the product was determined using dichloromethane as the solvent at 20° C. The viscosity-average molecular weight $\overline{M}v$ calculated from the solution viscosity was 31,000. From the fact that the results similar to those obtaiend in Example 27 were obtained by the instrumental analysis conducted in the same manner as in Example 27, the formed polymer was identified with a polycarbonate copolymer comprising 1,1'-bis(4-hydroxyphenyl)-m-diisopropylbenzene and 2,2-bis(4-hydroxy-3-tert-butylphenyl)propane in a ratio of 1:1.

EXAMPLE 29

Figure 29:
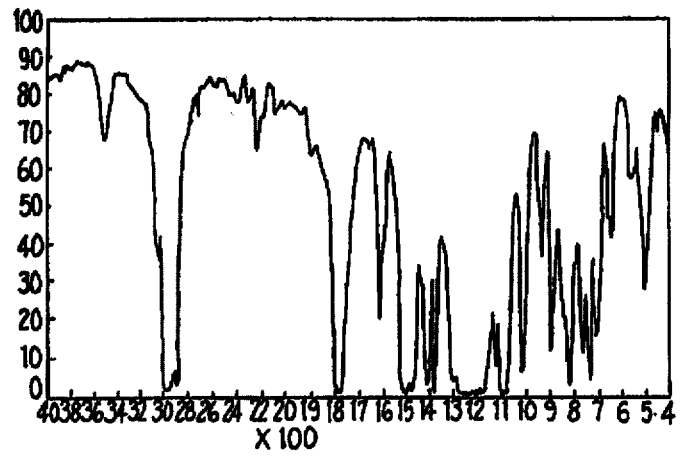
Figure 30:
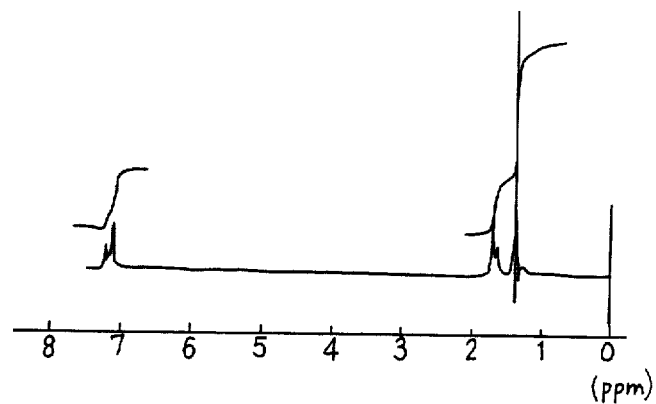

63 parts (15 molar %) of 1,1'-bis(4-hydroxyphenyl)-m-diisopropylbenzene, 347 parts (85 molar %) of 2,2-bis(4-hydroxy-3-tert-butylphenyl)propane and 264 parts of diphenyl carbonate were placed in a 3-l three-necked flask. After repeating degassing and nitrogen purge five times, the mixture was molten at 160° C. in a silicone bath while nitrogen was introduced thereinto. A solution of potassium borohydride (carbonation catalyst) in phenol prepared previously was added to the melt in an amount of $10^{-3}$ molar % based on the total amount of the bisphenol fed. After aging under stirring at 160° C. in a nitrogen atmosphere for 30 min, the pressure was reduced to 100 Torr at that temperature and the mixture was stirred for 30 min. Further the pressure was reduced to 50 Torr at that temperature and the reaction was continued for additional 60 min. The temperature was elevated slowly to 220° C. and the reaction was conducted for 60 min. The amount of phenol distilled until this step was 80% based on a theoretical amount. Then the pressure was reduced to 10 Torr at that temperature and the reaction was conducted for 30 min. The temperature was elevated slowly to 270° C. and the reaction was conducted for 30 min. Further the pressure was reduced to 5 Torr at that temperature and the reaction was conducted for 30 min. The precondensation was thus completed and a nearly theoretical amount of phenol was distilled until this step. Thereafter the postcondensation reaction was conducted at that temperature under 0.1 to 0.3 Torr for 2 h. The resulting polymer was taken out and cooled in a nitrogen atmosphere and its solution viscosity was determined using dichloromethane as the solvent at 20° C. The viscosity-average molecular weight $\overline{M}v$ calculated from the solution viscosity was 26,700. In its IR spectrum, a characteristic absorption of a carbonate bond was observed at 1720 to 1820 cm$^{-1}$ (FIG. 29). In its $^1$H-NMR spectrum, absorption of hydrogen in the methyl group of a tert-butyl group at 1.39 ppm, hydrogen of the methyl group of propane at 1.64 and 1.70 ppm and a phenyl group at 6.95 to 7.28 were observed (FIG. 30). From the results of the observation with DSC, it was found that the glass transition point Tg was 118° C. The photoelasticity constant C was 28 Brewsters (10$^{-12}$ m$^2$/N). From the integrated value of the NMR chart, it was confirmed that the polymer was a polycarbonate copolymer comprising 1,1'-bis(4-hydroxyphenyl)-m-diisopropylbenzene and 2,2-bis(4-hydroxy-3-tert-butylphenyl)propane in a ratio of 3:17.

EXAMPLE 30

A three-necked flask was provided with a stirrer, thermometer, gas-inlet tube and gas-outlet tube. 63 parts (15 molar %) of 1,1'-bis(4-hydroxyphenyl)-m-diisopropylbenzene and 347 parts (85 molar %) of 2,2-bis(4-hydroxy-3-tert-butylphenyl)propane were dissolved in a 10% aqueous sodium hydroxide solution. Dichloromethane was added to the solution thus prepared. Gaseous phosgene was introduced thereinto under vigorous stirring. Phosgene was introduced from a bomb into the flask through an empty gas-washing bottle, a gas washing bottle containing was and an empty gas washing bottled sequentially. The reaction temperature was kept below 25° C. with water during the introduction of gaseous phosgene. As the condensaiton reaction proceeded, the solution became viscous. Phosgene was introduced thereinto until yellow color of hhosgene/hydrogen chloride complex no more disappeared. After completion of the reaction, the reaction solution was poured into methanol, the mixture was filtered and the filtration residue was washed with water. This procedure was repeated. The polycarbonate thus formed in the form of a solution in dichloromethane was reprecipitated from methanol to purify the same.

After the purification followed by drying the solution viscosity of the product was determined using dichloromethane as the solvent at 20° C. The viscosity-average molecular weight $\overline{M}v$ calculated from the solution viscosity was 29,500. From the fact that the results similar to those obtained in Example 29 were obtained by the instrumental analysis conducted in the same manner as in Example 29, the formed polymer was identified with a polycarbonate copolymer comprising 1,1'-bis(4-hydroxyphenyl)-m-diisopropylbenzene and 2,2-bis(4-hydroxy-3-tert-butylphenyl)propane in a ratio of 3:17.

In the below shown examples, the viscosity-average molecular weight was determined with measurement of an intrinsic viscosity and the below shown formula, corresponding to that of bisphenol-A polycarbonate.

$$[\eta] = 111 \times 10^{-4} M^{0.82}$$

[E. Miller & O. Bayer, U.S. Pat. No. 2,999,844 (1961)]. which represents the relationship between the molecular weight M and the intrinsic viscosity $[\eta]$ of bisphenol-A polycarbonate measured at 20° C. using methylene chloride solution. The photoelasticity constant was obtained by substituting the formula (1) above for varied amounts of tensile stress applied in the longitudinal direction of a sample measuring $50 \times 10 \times 1$ mm. By the way, the photoelasticity constant of 2,2-bis-(4-hydroxyphenyl)propane was C=82 Brewsters, 10$^{-12}$ m$^2$/N.

EXAMPLE 31

A 3-l three-necked flask was charged with 145 parts by weight (50 mol %) of 2,2-bis(4-hydroxyphenyl)butane, 204 parts by weight (50 mol %) of 2,2-bis(4-hydroxy-3-tert-butylphenyl)propane, and 264 parts by weight of diphenyl carbonate. Deaeration and purging with a nitrogen gas were each repeated five times. Thereafter, the mixture was molten on a silicone bath at 160° C. while introducing a nitrogen gas thereinto. After the completion of the melting, a solution prepared by dissolving potassium borohydride as a carbonation catalyst in phenol (in an amount of 10$^{-3}$ mol % based on the total amount of the bisphenols fed) was added to the molten mixture, followed by stirring in a nitrogen atmosphere at 160° C. for 30 min. The mixture was then stirred at the same temperature under a pressure of 100 Torr for 30 min and then allowed to react at the same temperature under a pressure of 50 Torr for 60 min. The reaction mixture was gradually heated to 220° C., followed by reaction at that temperature for 60 min. 80% of the theoretical amount of phenol to be distilled was distilled away in the reactions up to this stage. Thereafter, the reaction was allowed to proceed at the same temperature under a reduced pressure of 10 Torr for 40 min. The temperature was gradually raised to 270° C., followed by reaction at that temperature for 30 min. Further, the reaction was allowed to proceed at the same temperature under a reduced pressure of 5 Torr for 30 min, thereby distilling away phenol in an amount substantially corresponding to the theoretical amount of phenol to be distilled. Thus, the step of pre-condensation was completed. Subsequently, the condensation was conducted at the same temperature under a pressure of 0.1 to 0.3 Torr for 2 hr. The resulting polymer as a product was taken out in a nitrogen gas atmosphere and allowed to cool. The solution viscosity of the polymer was determined at 20° C. using dichloromethane as a solvent. The viscosity-average molecular weight $(\overline{M}_v)$ of the polymer was calculated based on the value thus obtained and found to be 19,500.

EXAMPLE 32

A three-necked flask was provided with a stirrer, a thermometer, a gas inlet tube, and an exhaust tube. 145 parts by weight of 2,2-bis(4-hydroxyphenyl)-4-methylpentane and 204 parts by weight of 2,2-bis(4-hydroxy-3-tert-butylphenyl)propane were dissolved in 10 wt. % aqueous solution of sodium hydroxide. Dichloromethane was added to the resulting solution. A phosgene gas was fed into the solution with vigorous stirring. Phosgene was fed into the flask from a cylinder through an empty scrubbing bottle, a scrubbing bottle containing water and an empty scrubbing bottle in that order. The reaction temperature was kept at 25° C. or below during the supply of phosgene while cooling the flask with water. As the condensation reaction proceeded, the viscosity of the solution was increased. After the completion of the reaction, the reaction mixture was poured into methanol. The mixture was filtered, followed by repetition of washing with water. Polycarbonate thus obtained was reprecipitated from a dichloromethane solution with methanol to allow it to purify. Thereafter, the purified polymer was sufficiently dried. The solution viscosity of the polymer was then determined at 20° C. using dichloromethane as a solvent. The viscosity-average molecular weight ($\overline{M}_v$) of the polymer was calculated based on the value thus obtained and found to be 20,000.

EXAMPLE 33

A 3-l three-necked flask was charged with 162 parts by weight (50 mol %) of 2,2-bis(4-hydroxyphenyl)-4-methylpentane, 204 parts by weight (50 mol %) of 2,2-bis(4-hydroxy-3-tert-butylphenyl)propane, and 264 parts by weight of diphenyl carbonate. Deaeration and purging with a nitrogen gas were each repeated five times. Thereafter, the mixture was molten on a silicone bath at 160° C. while introducing a nitrogen gas thereinto. After the completion of the melting, a solution prepared by dissolving potassium borohydride as a carbonation catalyst in phenol (in an amount of $10^{-3}$ mol % based on the total amount of the bisphenols fed) was added to the molten mixture, followed by stirring in a nitrogen atmosphere at 160° C. for 30 min. The mixture was then stirred at the same temperature under a pressure of 100 Torr for 30 min and then allowed to react at the same temperature under a pressure of 50 Torr for 60 min. The reaction mixture was gradually heated to 220° C., followed by reaction at that temperature for 60 min. 80% of the theoretical amount of phenol to be distilled was distilled away in the reactions up to this stage. Thereafter, the reaction was allowed to proceed at the same temperature under a reduced pressure of 10 Torr for 40 min. The temperature was gradually raised to 270° C., followed by reaction at that temperature for 30 min. Further, the reaction was allowed to proceed at the same temperature under a reduced pressure of 5 Torr for 30 min, thereby distilling away phenol in an amount substantially corresponding to the theoretical amount of phenol to be distilled. Thus, the step of pre-condensation was completed. Subsequently, the condensation was conducted at the same temperature under a pressure of 0.1 to 0.3 Torr for 2 hr. The resulting polymer as a product was taken out in a nitrogen gas atmosphere and allowed to cool. The solution viscosity of the polymer was determined at 20° C. using dichloromethane as a solvent. The viscosity-average molecular weight ($\overline{M}_v$) of the polymer was calculated based on the value thus obtained and found to be 18,000.

EXAMPLE 34

A three-necked flask was provided with a stirrer, a thermometer, a gas inlet tube, and an exhaust tube. 162 parts by weight of 2,2-bis(4-hydroxyphenyl)-4-methylpentane and 204 parts by weight of 2,2-bis(4-hydroxy-3-tert-butylphenyl)propane were dissolved in dichloromethane. A 10 wt % aqueous solution of sodium hydroxide was added to the resulting solution. A phosgene gas was fed into the solution with vigorous stirring. Phosgene was fed into the flask from a cylinder through an empty scrubbing bottle, a scrubbing bottle containing water and an empty scrubbing bottle in that order. The reaction temperature was kept at 25° C. or below during the supply of phosgene while cooling the flask with water. As the condensation reaction proceeded, the viscosity of the solution was increased. Phosgene was further supplied until a yellow color derived from a phosgene-hydrogen chloride complex disappeared. After the completion of the reaction, the reaction mixture was poured into methanol. The mixture was filtered, followed by repetition of washing with water. Polycarbonate thus obtained was reprecipitated from a dichloromethane solution with methanol to allow it to purify. Thereafter, the purified polymer was sufficiently dried. The solution viscosity of the polymer was then determined at 20° C. using dichloromethane as a solvent. The viscosity-average molecular weight ($\overline{M}_v$) of the polymer was calculated based on the value thus obtained and found to be 19,800.

EXAMPLE 35

A 3-l three-necked flask was charged with 179 parts by weight (50 mol %) of 2,2-bis(4-hydroxyphenyl)octane, 204 parts by weight (50 mol %) of 2,2-bis(4-hydroxy-3-tert-butylphenyl)propane, and 264 parts by weight of diphenyl carbonate. Deaeration and purging with a nitrogen gas were each repeated five times. Thereafter, the mixture was molten on a silicone bath at 160° C. while introducing a nitrogen gas thereinto. After the completion of the melting, a solution prepared by dissolving potassium borohydride as a carbonation catalyst in phenol (in an amount of $10^{-3}$ mol % based on the total amount of the bisphenols fed) was added to the molten mixture, followed by stirring in a nitrogen atmosphere at 160° C. for 30 min. The mixture was then stirred at the same temperature under a pressure of 100 Torr for 30 min and then allowed to react at the same temperature under a pressure of 50 Torr for 60 min. The reaction mixture was gradually heated to 220° C., followed by reaction at that temperature for 60 min. 80% of the theoretical amount of phenol to be distilled was distilled away in the reactions up to this stage. Thereafter, the reaction was allowed to proceed at the same temperature under a reduced pressure of 10 Torr for 40 min. The temperature was gradually raised to 270° C., followed by reaction at that temperature for 30 min. Further, the reaction was allowed to proceed at the same temperature under a reduced pressure of 5 Torr for 30 min, thereby distilling away phenol in an amount substantially corresponding to the theoretical amount of phenol to be distilled. Thus, the step of pre-condensation was completed. Subsequently, the condensation was conducted at the same temperature under a pressure of 0.1 to 0.3 Torr for 2 hr. The resulting polymer as a product was taken out in a nitrogen gas atmosphere and allowed to cool. The solution viscosity of the polymer was determined at 20° C. using dichloromethane as a solvent. The viscosity-average molecular weight ($\overline{M}_v$) of the polymer was calculated based on the value thus obtained and found to be 18,000.

EXAMPLE 36

A three-necked flask was provided with a stirrer, a thermometer, a gas inlet tube, and an exhaust tube. 179 parts by weight of 2,2-bis(4-hydroxyphenyl)octane and 204 parts by weight of 2,2-bis(4-hydroxy-3-tert-butylphenyl)propane were dissolved in dichloromethane. A 10 wt % aqueous solution of sodium hydroxide was added to the resulting solution. A phosgene gas was fed into the solution with vigorous stirring. Phosgene was fed into the flask from a cylinder through an empty scrubbing bottle, a scrubbing bottle containing water and an empty scrubbing bottle in that order. The reaction temperature was kept at 25° C. or below during the supply of phosgene while cooling the flask with water. As the condensation reaction proceeded, the viscosity of the solution was increased. Phosgene was further supplied until a yellow color derived from a phosgene-hydrogen chloride complex disappeared. After the completion of the reaction, the reaction mixture was poured into methanol. The mixture was filtered, followed by repetition of washing with water. Polycarbonate thus obtained was reprecipitated from a dichloromethane solution with methanol to allow it to purify. Thereafter, the purified polymer was sufficiently dried. The solution viscosity of the polymer was then determined at 20° C. using dichloromethane as a solvent. The viscosity-average molecular weight ($\overline{M}_v$) of the polymer was calculated based on the value thus obtained and found to be 19,000.

Evaluation of recording characteristics

The polycarbonate copolymers as prepared above were each provided with a recording film, followed by evaluation of optical recording characteristics. Specifically, the polycarbonate copolymers as described in Examples 31, 32, 33, 34, 35 and 36 were molded into disk-shaped substrates each having a diameter of 130 mm and a thickness of 1.2 mm with an injection press (Dynamelter; a product of Meiki Co., Ltd.). A 1,000 Å-thick optical magnetic film was formed on the substrates thus obtained with an alloy target composed of $Tb_{23.5}Fe_{64.2}Co_{12.3}$ (atomic %) in a sputtering device (RF sputtering device; a product of Ulvac Corporation). On the recording film was formed a 1,000 Å-thick protective film composed of inorganic glass as described in Japanese Patent Laid-Open No. 177449/1985 which was filed by the applicant of the present application using the same sputtering device as that described above. The performance of the resulting optical magnetic recording disks were evaluated in terms of CN ratio, BER, and change in CN ratio at a temperature of 60° C. and an RH of 90%. The results are shown in Table 1.

TABLE 1

| Sample No. | birefringence (Δnd single pass) | CN (dB) (note: 1) | BER (bit error rate) | change in CN after 30 days (%) (note: 2) | Tg (°C.) | C |
|---|---|---|---|---|---|---|
| Ex. 31 | 10 | 52 | $2 \times 10^{-5}$ | 90 | 130 | 48 |
| Ex. 32 | 8 | 53 | $5 \times 10^{-6}$ | 95 | — | — |
| Ex. 33 | 9 | 53 | $6 \times 10^{-6}$ | 90 | 128 | 43 |
| Ex. 34 | 8 | 53 | $5 \times 10^{-6}$ | 95 | 128 | 43 |
| Ex. 35 | 10 | 52 | $2 \times 10^{-5}$ | 90 | 103 | 48 |
| Ex. 36 | 10 | 52 | $2 \times 10^{-5}$ | 90 | 103 | 48 |
| Comp. Ex. | 20 | 46 | $5 \times 10^{-5}$ | 85 | — | — |

TABLE 1-continued

| Sample No. | birefringence (Δnd single pass) | CN (dB) (note: 1) | BER (bit error rate) | change in CN after 30 days (%) (note: 2) | Tg (°C.) | C |
|---|---|---|---|---|---|---|
| (note: 3) | | | | | | |

Note:
(1) CN ratio: determined under the following conditions: writing power, 7 mW (milliwatt); reading power, 1 mW; frequency of carrier, 1 MHz; resolution band width, 30 kHz.
(2) change in CN (%): degree of lowering in CN 30 days after initiation of exposure to an atmosphere kept at a temperature of 60° C. and an RH of 90% relative to initial CN ratio.
(3) Comp. Ex.: an optical magnetic disk prepared in the same manner as mentioned above, except that a conventional polycarbonate substrate (AD-5503; a product of Teijin Chemicals Ltd.) was used.

As can be seen from Table 1, the polycarbonate copolymer according to the present invention has a remarkably improved CN ratio by virtue of the lowering in birefringence and is also excellent in durability.

EXAMPLE 37

A 3-l three-necked flask was charged with 161 parts by weight (50 mol %) of 1,1-bis(4-hydroxyphenyl)cyclohexane, 204 parts by weight (50 mol %) of 2,2-bis(4-hydroxy-3-tertbutylphenyl)propane, and 264 parts by weight of diphenyl carbonate. Deaeration and purging with a nitrogen gas were each repeated five times. Thereafter, the mixture was molten on a silicone bath at 160° C. while introducing a nitrogen gas thereinto. After the completion of the melting, a solution prepared by dissolving potassium borohydride as a carbonation catalyst in phenol (in an amount of $10^{-3}$ mol % based on the total amount of the bisphenols fed) was added to tha molten mixture, followed by stirring in a nitrogen atmosphere at 160° C. for 30 min. The mixture was then stirred at the same temperature under a pressure of 100 Torr for 30 min and then allowed to react at the same temperature under a pressure of 50 Torr for 60 min. The reaction mixture was gradually heated to 220° C., followed by reaction at that temperature for 60 min. 80% of the theoretical amount of phenol to be distilled was distilled away in the reactions up to this stage. Thereafter, the reaction was allowed to proceed at the same temperature under a reduced pressure of 10 Torr for 30 min. The temperature was gradually raised to 270° C., followed by reaction at that temperature for 30 min. Further, the reaction was allowed to proceed at the same temperature under a reduced pressure of 5 Torr for 30 min, thereby distilling away phenol in an amount substantially corresponding to the theoretical amount of phenol to be distilled. Thus, the step of pre-condensation was completed. Subsequently, the condensation was conducted at the same temperature under a pressure of 0.1 to 0.3 Torr for 2 hr. The resulting polymer as a product was taken out in a nitrogen gas atmosphere and allowed to cool. The solution viscosity of the polymer was determined at 20° C. using dichloromethane as a solvent. The viscosity-average molecular weight ($\overline{M}_v$) of the polymer wss calculated based on the value thus obtained and found to be 20,800.

EXAMPLE 38

A three-necked flask was provided with a stirrer, a thermometer, a gas inlet tube, and an exhaust tube. 161 parts by weight of 1,1-bis(4-hydroxyphenyl)cyclohexane and 204 parts by weight of 2,2-bis(4-hydroxy-3-tert-butylphenyl)propane were dissolved in 10 wt. % aqueous solution of sodium hydroxide. Dichloromethane was added to the resulting solution. A phosgene gas was fed into the solution with vigorous stirring. Phosgene was fed into the flask from a cylinder through an empty scrubbing bottle, a scrubbing bottle containing water and an empty scrubbing bottle in that order. The reaction temperature was kept at 25° C. or below during the supply of phosgene while cooling the flask with water. As the condensation reaction proceeded, the viscosity of the solution was increased after the completion of the reaction, the reaction mixture was poured into methanol. The mixture was filtered, followed by repetition of washing with water. Polycarbonate thus obtained was reprecipitated from a dichloromethane solution with methanol to allow it to purify. Thereafter, the purified polymer was sufficiently dried. The solution viscosity of the polymer was then determined at 20° C. using dischloromethane as a solvent. The viscosity-average molecular weight ($\overline{M}_v$) of the polymer was calculated based on the value thus obtained and found to be 22,000.

EXAMPLE 39

A 3-l three-necked flask was charged with 102 parts by weight (30 mol %) of 2,2-bis(3,5-dimethyl-4-hydroxyphenyl)propane, 286 parts by weight (70 mol %) of 2,2-bis(4-hydroxy-3-tert-butylphenyl)propane, and 264 parts by weight of diphenyl carbonate. Deaeration and purging with a nitrogen gas were each repeated five times. Thereafter, the mixture was molten on a silicone bath at 160° C. while introducing a nitrogen gas thereinto. After the completion of the melting, a solution prepared by dissolving potassium borohydride as a carbonation catalyst in phenol (in an amount of $10^{-3}$ mol % based on the total amount of the bisphenols fed) was added to the molten mixture, followed by stirring in a nitrogen atmosphere at 160° C. for 30 min. The mixture was then stirred at the same temperature under a pressure of 100 Torr for 30 min and then allowed to react at the same temperature under a pressure of 50 Torr for 60 min. The reaction mixture was gradually heated to 220° C., followed by reaction at that temperature for 60 min. 80% of the theoretical amount of phenol to be distilled was distilled away in the reactions up to this stage. Thereafter, the reaction was allowed to proceed at the same temperature under a reduced pressure of 10 Torr for 60 min. The temperature was gradually raised to 270° C., followed by reaction at that temperature for 40 min. Further, the reaction was allowed to proceed at the same temperature under a reduced pressure of 5 Torr for 30 min, thereby distilling away phenol in an amount substantially corresponding to the theoretical amount of phenol to be distilled. Thus, the step of precondensation was completed. Subsequently, the condensation was conducted at the same temperature under a pressure of 0.1 to 0.3 Torr for 2 hr. The resulting polymer as a product was taken out in a nitrogen gas atmosphere and allowed to cool. The solution viscostty of the polymer was determined at 20° C. using dichloromethane as a solvent. The viscosity-average molecular weight ($\overline{M}_v$) of the polymer was calculated based on the value thus obtained and found to be 16,000.

EXAMPLE 40

A three-necked flask was provided with a stirrer, a thermometer, a gas inlet tube, and an exhaust tube. 102 parts by weight of 2,2-bis(3,5-dimethyl-4-hydroxyphenyl)propane and 286 parts by weight of 2,2-bis(4-hydroxy-3-tert-butylphenyl)propane were dissolved in 10 wt. % aqueous solution of sodium hydroxide. Dichloromethane was added to the resulting solution. A phosgene gas was fed into the solution with vigorous stirring. Phosgene was fed into the flask from a cylinder through an empty scrubbing bottle, a scrubbing bottle containing water and an empty scrubbing bottle in that order. The reaction temperature was kept at 25° C. or below during the supply of phosgene while cooling the flask with water. As the condensation reaction proceeded, the viscosity of the solution was increased. After the completion of the reaction, the reaction mixture was poured into methanol. The mixture was filtered, followed by repetition of washing with water. Polycarbonate thus obtained was reprecipitated from a dichloromethane solution with methanol to allow it to purify. Thereafter, the purified polymer was sufficiently dried. The solution viscosity of the polymer was then determined at 20° C. using dichloromethane as a solvent. The viscosity-average molecular weight ($\overline{M}_v$) of the polymer was calculated based on the value thus obtained and found to be 19,000.

The copolymers obtained in Examples 37 to 40 were examined in the same way as shown in Example 31. Results are shown in Table 2.

TABLE 2

| Sample No. | birefringence ($\Delta$nd single pass) | CN (dB) (note: 1) | BER (bit error rate) | change in CN after 30 days (%) (note: 2) | Tg (°C.) | C |
|---|---|---|---|---|---|---|
| Ex. 37 | 9 | 52 | $6 \times 10^{-6}$ | 90 | 137 | 39 |
| Ex. 38 | 7 | 54 | $4 \times 10^{-6}$ | 94 | 137 | 39 |
| Ex. 39 | 8 | 53 | $5 \times 10^{-6}$ | 90 | 144 | 38 |
| Ex. 40 | 6 | 55 | $2 \times 10^{-6}$ | 95 | 144 | 38 |

What is claimed is:

1. An aromatic polycarbonate copolymer composed of 1 to 99 mole percent of the unit of 2,2-bis(4-hydroxy-3-tertiary-butyl-phenyl)propane, 99 to 1 mole percent of the unit of a comonomer selected from the group consisting of
   (1) 2,2-bis(4-hydroxyphenyl)propane,
   (2) 4,4'-dihydroxy-2,2,2-triphenylethane,
   (3) 2,2-bis(4-hydroxy-3-methylphenyl)-propane,
   (4) 1,1'-bis(4-hydroxyphenyl)-p-diisopropylbenzene,
   (5) 1,1'-bis(4-hydroxyphenyl)-m-diisopropyl-benzene,
   (6) 2,2-bis(4-hydroxyphenyl)butane,
   (7) 2,2-bis(4-hydroxyphenyl)-4-methylpentane,
   (8) 2,2-bis(4-hydroxyphenyl)octane,
   (9) 1,1-bis(4-hydroxyphenyl)cyclohexane and
   (10) 2,2-bis(3,5-dimethyl-4-hydroxyphenyl)propane
   and a carbonate group located between the two units.

2. A copolymer as claimed in claim 1, in which said comonomer is selected from the group consisting of (1), (2), (3), (4) and (5).

3. A copolymer as claimed in claim 1, which is composed of 5 to 95 mole percent of the unit of 2,2-bis(4-hydroxy-3-tertiary-butyl-phenyl)propane, 95 to 5 mole percent of the unit of a comonomer selected from the group consisting of (1), (2), (4), (5) and (9) and a carbonate group located between the two units.

4. A copolymer as claimed in claim 1, which is composed of 3 to 97 mole percent of the unit of 2,2-bis(4-hydroxy-3-tertiary-butyl-phenyl)propane, 97 to 3 mole percent of the unit of a comonomer selected from the group consisting of (6), (7), (8) and (10) and a carbonate group located between the two units.

5. A copolymer as claimed in claim 1, which has a viscosity-average molecular weight of 10,000 to 100,000.

6. An optical disk which comprises a substrate of the copolymer as defined in any one of claims 1 to 5.

7. An optical disk as claimed in claim 6, in which the copolymer has a viscosity-average molecular weight of 13,000 to 50,000.

* * * * *